US012526362B2

(12) United States Patent
Fan

(10) Patent No.: US 12,526,362 B2
(45) Date of Patent: Jan. 13, 2026

(54) LOCK SCREEN DISPLAY METHOD FOR ELECTRONIC DEVICE AND ELECTRONIC DEVICE

(71) Applicant: Huawei Technologies Co., Ltd., Shenzhen (CN)

(72) Inventor: Hua Fan, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 413 days.

(21) Appl. No.: 18/006,318

(22) PCT Filed: Jul. 19, 2021

(86) PCT No.: PCT/CN2021/107149
§ 371 (c)(1),
(2) Date: Jan. 20, 2023

(87) PCT Pub. No.: WO2022/017328
PCT Pub. Date: Jan. 27, 2022

(65) Prior Publication Data
US 2023/0300240 A1 Sep. 21, 2023

(30) Foreign Application Priority Data
Jul. 22, 2020 (CN) .......................... 202010711209.4

(51) Int. Cl.
H04M 1/72463 (2021.01)
H04M 1/67 (2006.01)

(52) U.S. Cl.
CPC ......... *H04M 1/72463* (2021.01); *H04M 1/67* (2013.01)

(58) Field of Classification Search
None
See application file for complete search history.

(56) References Cited

U.S. PATENT DOCUMENTS

2012/0284789 A1* 11/2012 Kim ...................... H04W 4/021
726/19
2019/0138205 A1* 5/2019 Wu ...................... G06F 3/04883

FOREIGN PATENT DOCUMENTS

| CN | 102520940 A | 6/2012 |
|---|---|---|
| CN | 104615350 A | 5/2015 |
| CN | 105740669 A | 7/2016 |
| CN | 106161789 A | 11/2016 |
| CN | 107368310 A | 11/2017 |
| CN | 110995917 A | 4/2020 |

* cited by examiner

*Primary Examiner* — Frantz Bataille
(74) *Attorney, Agent, or Firm* — Conley Rose, P.C.

(57) ABSTRACT

A lock screen display method includes: displaying, before a predetermined rule is triggered, for a plurality of lock screens, a lock screen with a high sequence level in a predetermined sequence on a screen of a mobile phone as a lock screen; determining, after the predetermined rule is triggered, a lock screen from the plurality of lock screens; and displaying the lock screen on the screen. A user can view information on a lock screen and operate the lock screen without unlocking the lock screens one by one.

20 Claims, 11 Drawing Sheets

LOCK SCREEN DISPLAY METHOD FOR ELECTRONIC DEVICE AND ELECTRONIC DEVICE

CROSS-REFERENCE TO RELATED APPLICATIONS

This is a National Stage of International Patent Application No. PCT/CN2021/107149 filed on Jul. 19, 2021, which claims priority to Chinese Patent Application No. 202010711209.4 filed on Jul. 22, 2020. The disclosures of the aforementioned patent applications are hereby incorporated by reference in their entireties.

TECHNICAL FIELD

This application relates to the communications field, and in particular, to a lock screen display method for an electronic device and an electronic device.

BACKGROUND

Electronic devices such as a smartphone, a tablet computer, and a notebook computer are widely used in daily life due to portability. A user may download various applications (application, APP) on an electronic device to meet an entertainment requirement, a shopping requirement, a learning requirement, and the like of the user. A mobile phone is used as an example. To protect privacy of a user and avoid a misoperation of the user, lock screens are set on all mobile phones. Lock screen manners include a lock screen included in an operating system of the mobile phone and a lock screen provided by a third-party application downloaded on the mobile phone. The lock screen provided by the third-party application covers the lock screen included in the operating system of the mobile phone, to form a third-party lock screen. For example, a lock screen provided by a music APP covers the lock screen included in the operating system of the mobile phone, to form a music lock screen, or a lock screen provided by an exercise APP covers the lock screen included in the operating system of the mobile phone, to form an exercise lock screen. Each third-party application can provide, on a lock screen of the third-party application, content display and common function operations of the application, to implement quick viewing of content of the application and quick control of the application when the lock screen included in the operating system is not unlocked.

In the current lock screen manner, privacy of a user is protected and a misoperation of the user is avoided. In addition, a third-party lock screen provided by a third-party application implements viewing of content of the application and quick control of the application when a mobile phone is not unlocked. However, when a plurality of third-party applications are running and a plurality of third-party lock screens exist, it is most convenient to view and operate a lock screen displayed at an uppermost layer. When content of a next-layer lock screen of the lock screen at the uppermost layer changes, the user can view content of the next-layer lock screen of the lock screen at the uppermost layer only after removing the lock screen at the uppermost layer. Operations are cumbersome, and therefore user experience is affected.

SUMMARY

The present invention aims to provide a lock screen display method for an electronic device and an electronic device. A user can view information on a lock screen and operate the lock screen without unlocking lock screens one by one. Operations are simple, and therefore user experience is improved.

According to a first aspect, an embodiment of this application discloses a lock screen display method for an electronic device. The electronic device includes a plurality of to-be-displayed lock screens, and the lock screen display method for the electronic device includes the following operations:

A first lock screen with a highest sequence level in the plurality of lock screens is displayed on a screen of the electronic device based on a preset sequence. The preset sequence may be set based on at least priorities of applications corresponding to the lock screens. A lock screen with a higher priority has a higher corresponding sequence level and is preferentially displayed on the screen of the electronic device.

A second lock screen is determined from the plurality of lock screens based on triggering of a preset condition.

The preset condition includes at least the following: When content displayed on the lock screens changes (content output by the applications changes), the electronic device uses, as a target lock screen, a lock screen whose content changes, and displays the lock screen on the screen of the electronic device.

When a user operates the electronic device, and enables, based on each operation manner of the user, status data of the electronic device to meet a status data switching requirement corresponding to each operation manner, the electronic device determines the target lock screen in descending order of sequence levels based on the preset sequence, and displays the target lock screen on the screen of the electronic device through switching.

The applications corresponding to the lock screens request the electronic device to use the lock screens of the applications as target lock screens and display the lock screens on the screen of the electronic device.

The second lock screen is displayed on the screen.

The lock screens are arranged in the predetermined sequence, and a lock screen with a high sequence level is first displayed on the screen of the electronic device as a lock screen 1. Based on triggering of the predetermined condition, a lock screen is determined as a lock screen 2 and displayed on the screen of the electronic device. In this way, before a predetermined rule is triggered, for the plurality of lock screens, the lock screen with the high sequence level in the predetermined sequence is displayed on the screen of the electronic device as the lock screen 1. After the predetermined rule is triggered, the electronic device can determine the lock screen 2 from the plurality of lock screens and display the lock screen 2 on the screen. The user can view information on a lock screen and operate the lock screen without unlocking the lock screens one by one. Operations are simple, and therefore user experience is improved.

According to some embodiments disclosed in the first aspect of this application, the preset condition is triggered when content displayed on a lock screen changes, and a target lock screen whose displayed content changes is selected as the second lock screen.

According to some embodiments disclosed in the first aspect of this application, at least a part of the plurality of lock screens are lock screens associated with applications in the electronic device; and the change in the content displayed on the lock screen is associated with a change in content output by an application.

According to some embodiments disclosed in the first aspect of this application, when a first application corresponding to the first lock screen changes content displayed on the first lock screen, the content of the first lock screen is updated to form the second lock screen.

According to some embodiments disclosed in the first aspect of this application, when a second application different from the first application changes content displayed on a lock screen corresponding to the second application, the lock screen corresponding to the second application is used as the second lock screen.

According to some embodiments disclosed in the first aspect of this application, when a plurality of applications trigger the foregoing rule, to avoid a problem that a lock screen of another application cannot be displayed due to cyclical lock screen switching between lock screens at first two high sequence levels, according to some embodiments of this application, after completing sequential switching and display of lock screens of the plurality of applications that trigger the foregoing rule, the electronic device cyclically switches to the lock screen with the high sequence level.

According to some embodiments disclosed in the first aspect of this application, to avoid a problem that a lock screen of another application that triggers the foregoing rule cannot be displayed on the screen of the electronic device because a target lock screen of a same application is displayed on the display of the electronic device for long time, according to some embodiments of this application, when only one application triggers the foregoing rule, after time during which the lock screen 2 used as the target lock screen is displayed on the screen of the electronic device reaches predetermined time, for example, 30 minutes, the electronic device recovers an original display sequence of the lock screens of the applications based on the preset sequence.

According to some embodiments disclosed in the first aspect of this application, when a plurality of target lock screens exist, if a plurality of second lock screens are determined based on the preset condition, a second lock screen with a highest sequence level in the preset sequence is selected from the plurality of determined second lock screens and displayed on the screen.

According to some embodiments disclosed in the first aspect of this application, the preset condition is triggered when the electronic device receives a preset operation manner of the user for the electronic device.

According to some embodiments disclosed in the first aspect of this application, the operation manner includes: the user presses a power button of the electronic device to enable the electronic device to switch between a screen-on state and a screen-off state; and
  the determining a second lock screen includes:
   determining a time difference of the screen between a screen-on state and a screen-off state that are adjacent; and
   when the time difference meets a switching requirement in the preset condition, determining, as the second lock screen based on the preset sequence, a lock screen ranked next to the first lock screen.

According to some embodiments disclosed in the first aspect of this application, the operation manner includes: the user shakes the electronic device; and
  the determining a second lock screen includes:
   determining, as the second lock screen based on motion data of the electronic device and the preset sequence, a lock screen ranked next to the first lock screen.

According to some embodiments disclosed in the first aspect of this application, when the motion data is greater than a first threshold, the second lock screen is determined based on the preset sequence and displayed on the screen.

According to some embodiments disclosed in the first aspect of this application, the preset sequence is set based on the priorities of the applications corresponding to the lock screens, and a lock screen corresponding to an application with a higher priority has a higher sequence level and is preferentially displayed on the screen of the electronic device.

According to some embodiments disclosed in the first aspect of this application, the priorities of the applications are customized by the user; and
  the customization includes:
   presenting an application setting interface for the user, where the application setting interface includes at least two different applications, and each application is configured to be capable of presenting a corresponding lock screen on the electronic device; and
   setting the priorities based on a sequence in which the user sets the lock screens, where a lock screen that is set earlier has a higher priority.

According to some embodiments disclosed in the first aspect of this application, the priorities are set based on access frequency of the user for the applications.

According to some embodiments disclosed in the first aspect of this application, it is determined, based on lock screen application identifiers carried in the applications, that the applications have the lock screens.

According to some embodiments disclosed in the first aspect of this application, when the content on the lock screen of the application changes, a target application corresponding to a lock screen whose displayed content changes requests the electronic device to switch the lock screen of the target application to the screen for display and determine the target lock screen as the second lock screen.

According to some embodiments disclosed in the first aspect of this application, within predetermined time, request frequency at which the target application is allowed to request the electronic device to use the lock screen of the target application as the second lock screen through switching is less than a threshold.

According to some embodiments disclosed in the first aspect of this application, lock screen windows of the applications corresponding to the lock screens are all pushed into a pre-established window stack.

According to some embodiments disclosed in the first aspect of this application, the lock screen windows are sequentially pushed into the window stack based on priorities of the applications, that is, the lock screen windows are pushed into the window stack in ascending order of the priorities of the applications, and a sequence in which the lock screen windows are pulled from the stack is used as the preset sequence of the lock screens of the applications.

According to some embodiments disclosed in the first aspect of this application, the determining a second lock screen from the plurality of lock screens and displaying the second lock screen on the screen includes:
  performing a stack pulling operation on the lock screen windows in the window stack until a target lock screen window used as the second lock screen is pulled from the stack; and
  pushing lock screen windows pulled from the stack into the window stack based on the preset sequence, and pushing the target lock screen window into the top of the window stack.

According to some embodiments disclosed in the first aspect of this application, after time during which the first lock screen is displayed on the screen reaches predetermined time, the first lock screen and a next-sequence-level lock screen of the first lock screen are pulled from the stack; and the first lock screen is pushed into the stack, and the next-sequence-level lock screen of the first lock screen is pushed into the top of the stack, to display the next-sequence-level lock screen of the first lock screen on the screen of the electronic device as the second lock screen.

According to some embodiments disclosed in the first aspect of this application, after time during which the second lock screen is displayed on the screen reaches predetermined time, a stack pulling operation is performed on a lock screen pulled window from the stack and the second lock screen again, and the lock screen window pulled from the stack and the second lock screen are pushed into the stack again based on the preset sequence.

According to a second aspect, an embodiment of this application discloses an electronic device. The electronic device includes a plurality of to-be-displayed lock screens, and the electronic device includes at least one processor and at least one memory.

The at least one memory stores instructions.

When the instructions are executed by the at least one processor, the electronic device is enabled to perform the following operations:
  displaying, on a screen of the electronic device based on a preset sequence, a first lock screen with a highest sequence level in the plurality of lock screens;
  determining a second lock screen from the plurality of lock screens based on triggering of a preset condition; and
  displaying the second lock screen on the screen.

The lock screens are arranged in the predetermined sequence, and a lock screen with a high sequence level is first displayed on the screen of the electronic device 10 as a lock screen 1. Based on triggering of the predetermined condition, a lock screen is determined as a lock screen 2 and displayed on the screen of the electronic device 10. In this way, before a predetermined rule is triggered, for the plurality of lock screens, the lock screen with the high sequence level in the predetermined sequence is displayed on the screen of the electronic device as the lock screen 1. After the predetermined rule is triggered, the electronic device can determine the lock screen 2 from the plurality of lock screens and display the lock screen 2 on the screen. A user can view information on a lock screen and operate the lock screen without unlocking the lock screens one by one. Operations are simple, and therefore user experience is improved.

According to some embodiments disclosed in the second aspect of this application, when the instructions are executed by the at least one processor, the electronic device is enabled to further perform the following steps:
  triggering the preset condition when content displayed on a lock screen changes, and selecting, as the second lock screen, a target lock screen whose displayed content changes.

According to some embodiments disclosed in the second aspect of this application, when the instructions are executed by the at least one processor, the electronic device is enabled to further perform the following step:
  triggering the preset condition when the electronic device receives a preset operation manner of the user for the electronic device.

According to some embodiments disclosed in the second aspect of this application, when the instructions are executed by the at least one processor, the electronic device is enabled to further perform the following step:
  setting the preset sequence based on priorities of applications corresponding to the lock screens, where a lock screen with a higher priority has a higher sequence level and is preferentially displayed on the screen of the electronic device.

Other features and corresponding beneficial effects of the present invention are set forth in the following part of the specification, and it should be understood that at least a part of the beneficial effects are apparent from the description in the specification of the present invention.

DESCRIPTION OF EMBODIMENTS

The following describes embodiments of this application with reference to accompanying drawings by using an example in which an electronic device is a mobile phone. In addition, the electronic device may be alternatively a tablet computer, a notebook computer, a laptop computer, or the like.

Figure 1A:
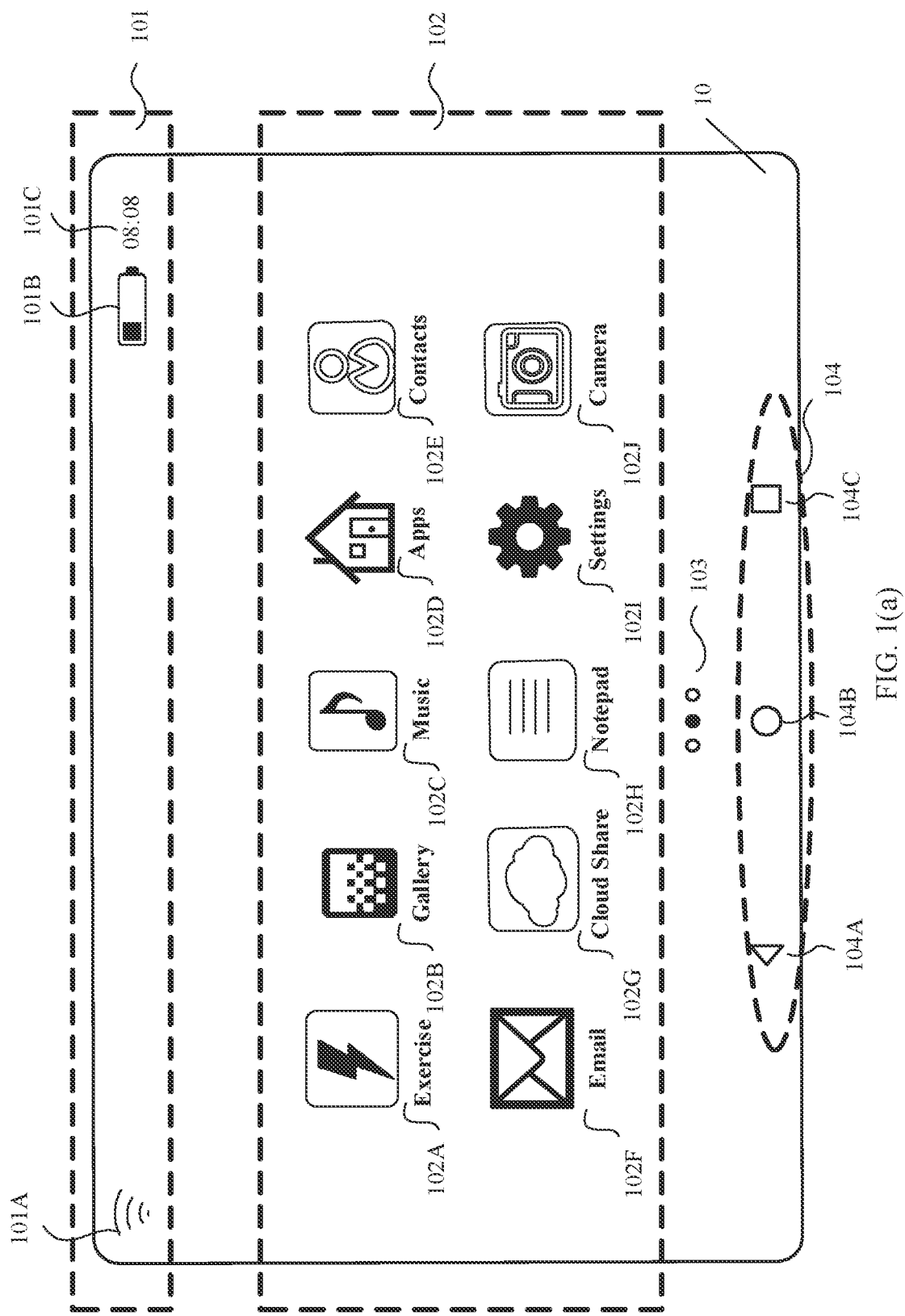
FIG. 1(a) illustrates an example user interface that is on a mobile phone and that is used to display applications installed in the mobile phone.

FIG. 1(a) illustrates an example user interface that is on a mobile phone 10 and that is used to display applications installed in the mobile phone.

A user interface 100 may include a status bar 101 and application icons 102.

The status bar 101 may include one or more signal strength indicators 101A of a wireless fidelity (wireless fidelity, Wi-Fi) signal, a battery status indicator 101B, and a time indicator 101C. In some embodiments, the status bar 101 may further include one or more signal strength indicators of a mobile communication signal (also referred to as a cellular signal), and an operator name (for example, "China Mobile").

In some embodiments of this application, the user interface 100 may further include a navigation bar 104. The navigation bar 104 may include system navigation keys such as a return key 104A, a home key 104B, and a multitasking key 104C. The navigation keys may have other names. This is not limited in this application. Each navigation key in the navigation bar 104 is not limited to a virtual key, and may be alternatively implemented as a physical button.

The application icons 102 may be an exercise icon 102A, a gallery icon 102B, a music icon 102C, an app store icon 102D, a contacts icon 102E, an email icon 102F, a system lock screen application icon 102G, a notepad icon 102H, a settings icon 102I, a camera icon 102J, and the like. The user interface 10 may further include a page indicator 103. Other application icons may be distributed on a plurality of pages, and the page indicator 103 may be used to indicate a specific page on which a user currently browses an application. The user may leftward or rightward slide an area of another application icon to browse an application icon on another page.

In some embodiments of this application, a touch panel is configured for a display of the mobile phone 10, and may be configured to receive a touch operation of the user. The touch operation is an operation in which the user is contact with the display by using a hand, an elbow, a stylus, or the like. The touch operation of the user may be tapping the application icons 102 to implement operations of applications.

It may be understood that FIG. 1(*a*) merely illustrates the user interface on the mobile phone 10, and the user interface may further include other application icons or other information. This should not constitute a limitation on this embodiment of this application.

The settings 102I may receive a user operation (for example, a touch operation), and in response to the detected user operation, the mobile phone 10 may display an application setting interface of lock screens of applications. The application setting interface includes at least two different applications, and each application is configured to be capable of presenting a corresponding lock screen on the display of the mobile phone 10. The user may touch corresponding lock screens to determine a display sequence of the lock screens.

According to this embodiment of this application, an exercise application and a music application correspondingly have lock screens. The lock screens are a music lock screen and an exercise lock screen that are provided by the music application and the exercise application and that are presented on the screen of the mobile phone when the mobile phone is in a screen-on locked state. In addition to the exercise application and the music application, the mobile phone 100 has a system wallpaper.

Some applications in the application icons 102 and a system of the mobile phone 10 may provide lock screens for the mobile phone 10 when the mobile phone 10 is in a screen-off state or a screen-on locked state. The lock screens are, for example, the exercise lock screen provided by the exercise application corresponding to the exercise icon 102A, the music lock screen provided by the music application corresponding to the music icon 102C, and a system lock screen 102K included in the system of the mobile phone 10.

The settings 102I may receive a user operation (for example, a touch operation), and in response to the detected user operation, the mobile phone 10 may display an application setting interface of lock screens of applications. The application setting interface includes at least two different applications, and each application is configured to be capable of presenting a corresponding lock screen on the display of the mobile phone 10. The user may touch corresponding lock screens to determine a display sequence of the lock screens.

According to some embodiments of this application, the lock screens are arranged in a predetermined sequence, and a lock screen with a high sequence level is first displayed on the screen of the mobile phone 10 as a lock screen 1. Based on triggering of a predetermined condition, a lock screen is determined as a lock screen 2 and displayed on the screen of the mobile phone 10. In this way, before a predetermined rule is triggered, for the plurality of lock screens, the lock screen with the high sequence level in the predetermined sequence is displayed on the screen of the mobile phone as the lock screen 1. After the predetermined rule is triggered, the mobile phone can determine the lock screen 2 from the plurality of lock screens and display the lock screen 2 on the screen. The user can view information on a lock screen and operate the lock screen without unlocking the lock screens one by one. Operations are simple, and therefore user experience is improved.

The following describes a structure of the mobile phone 10 that implements the lock screen display method illustrated in the foregoing embodiments of this application.

Figure 2A:
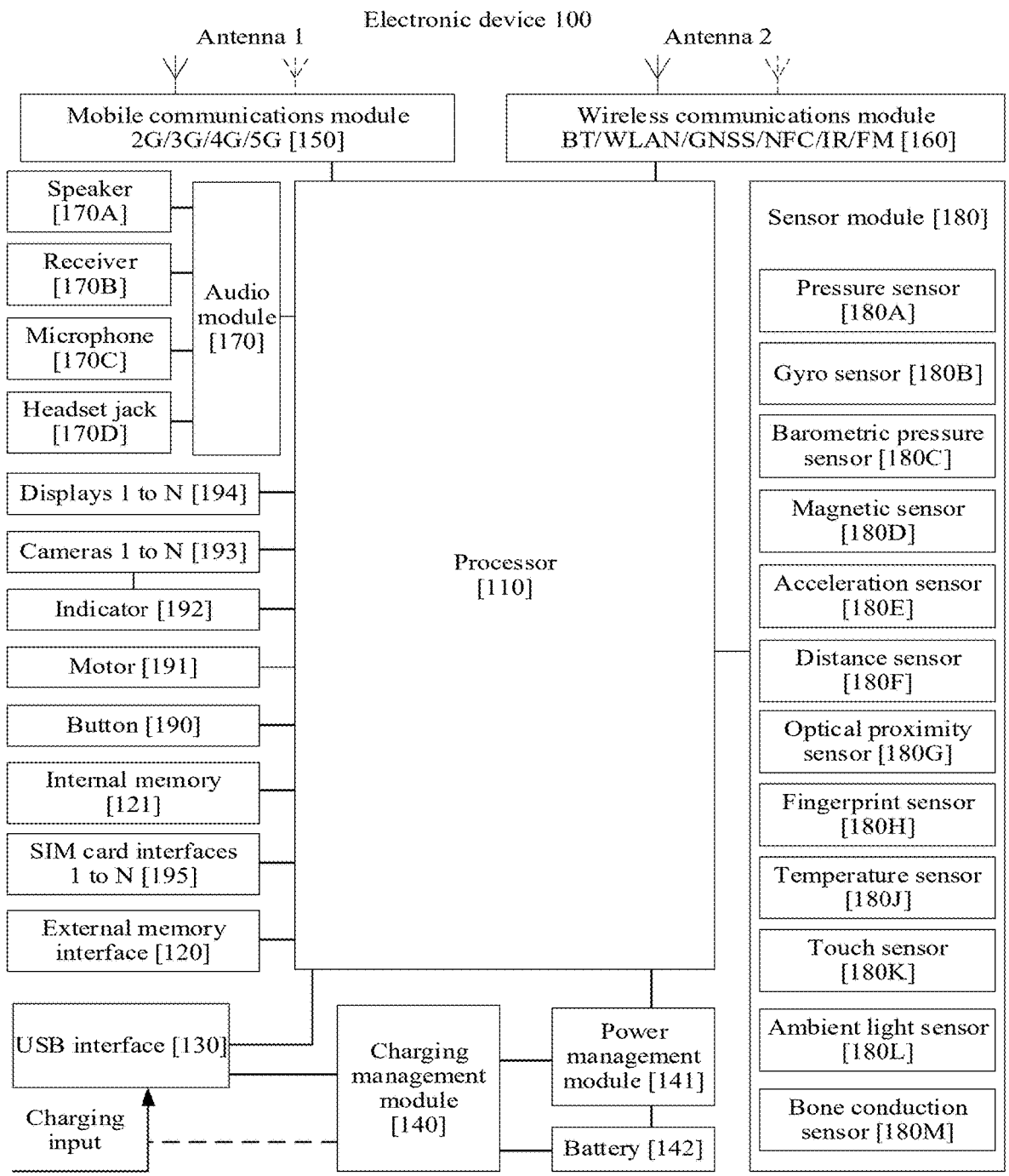
FIG. 2(a) is a schematic diagram of a hardware structure of a mobile phone.

First, refer to FIG. 2(*a*). FIG. 2(*a*) is a schematic diagram of a hardware structure of the mobile phone 10.

The mobile phone 10 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, a gravity sensor (not shown in the figure), and the like. It may be understood that the structure shown in this embodiment of the present invention constitutes no specific limitation on the mobile phone 10. In some other embodiments of this application, the mobile phone 10 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The processor 110 may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency. For this embodiment of this application, the memory may store application packages of the applications in FIG. 1(a), data of lock screens of the applications, data generated by the applications in running processes, and the like. In addition, the memory may further store the user interface, the preset sequence, and the preset condition that are described in the foregoing embodiments, for use by the processor 110.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may also store data (for example, audio data or a phone book) created in a process of using the mobile phone 10. In addition, the internal memory 121 may include a high-speed random access memory, and may further include a nonvolatile memory, for example, at least one magnetic disk storage device, a flash memory device, or a universal flash storage (universal flash storage, UFS). The processor 110 runs instructions stored in the internal memory 121 and/or instructions stored in the memory disposed in the processor, to perform various function applications and data processing of the mobile phone 10.

The wireless communications module 160 may provide a wireless communication solution that is applied to the mobile phone 10 and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, or the like.

The display 194 is configured to display an interface that is related to a running service of the smart TV 10 and that is included in remote view logic information. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diode, QLED), or the like. In some embodiments, the mobile phone 10 may include one or N displays 170, where N is a positive integer greater than 1.

The button 190 may include a power button, a volume button, or the like on the mobile phone 10. The user may operate the power button to enable the mobile phone 10 to switch between a screen-on state and a screen-off state. The user may operate the volume button to increase or decrease a playback volume of the mobile phone 10.

The gyroscope sensor 180B may be configured to determine a motion gesture of the mobile phone 10. In some embodiments, angular velocities of the mobile phone 10 around three axes (that is, axes x, y, and z) may be determined by using the gyroscope sensor 180B.

The touch sensor 180K is also referred to as a "touch component". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may be alternatively disposed on a surface of the mobile phone 10, which is different from a position of the display 194. After the user touches the display of the mobile phone 10, the touch sensor 180K detects the touch operation of the user and transmits the touch operation to the processor. The processor executes an instruction stored in the processor. The instruction implements a quantity of times the user touches a notification message on the display of the mobile phone, to correspondingly expand content and an operation that are related to the notification message.

The acceleration sensor 180E may detect values of accelerations of the mobile phone in all directions (usually three axes). When the mobile phone 10 is stationary, the acceleration sensor 180E may detect a value and a direction of gravity. The acceleration sensor 180E may be further configured to identify a posture of the mobile phone, and is applied to applications such as horizontal-vertical screen switching and a pacemaker.

The gravity sensor is a sensor that converts motion or gravity into an electrical signal, and is mainly configured to measure parameters such as an oblique angle, an inertia force, impact, and vibration. When the user shakes the mobile phone 10, the gravity sensor 118 may measure a shaking speed of the mobile phone 10.

A software system of the mobile phone 10 may use a layered architecture, an event-driven architecture, a microkernel architecture, a microservice architecture, or a cloud architecture. In this embodiment of this application, an Android system of a layered architecture is used as an example to illustrate a software structure of the mobile phone 10.

Figure 2B:
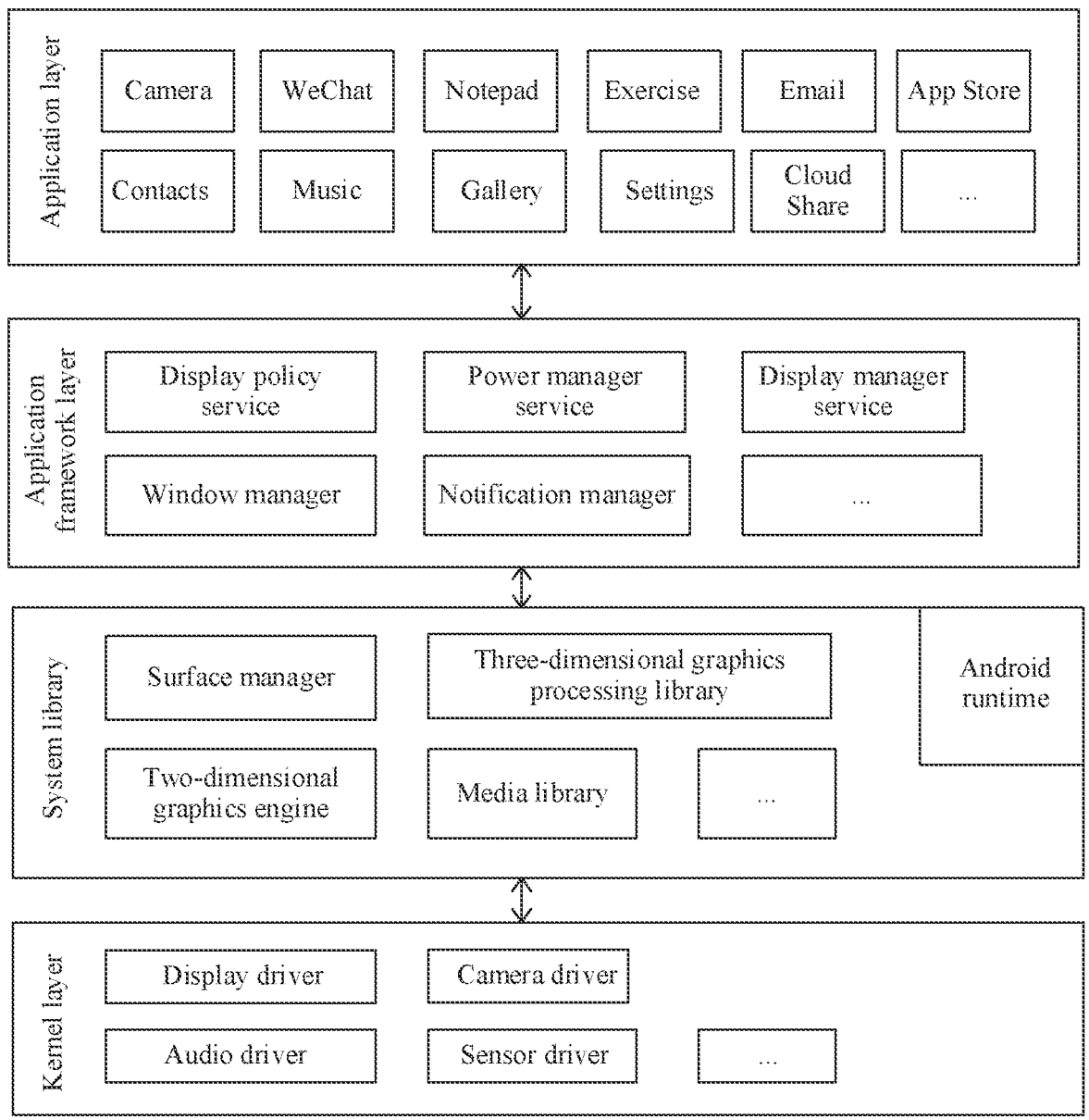
FIG. 2(b) is a block diagram of a software structure of a mobile phone 10.

FIG. 2(b) is a block diagram of a software structure of the mobile phone 10.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2(b), the application packages may include applications such as Camera, Exercise, Gallery, App Store, Contacts, Email, Cloud Share, Notepad, Settings, Music, and Messaging.

The application framework layer provides an application programming interface (application programming interface, API) and a programming framework for an application at the application layer. The application framework layer includes some predefined functions.

As shown in FIG. 2(b), the application framework layer may include a display policy service, a power manager service (power manager service, PMS), and a display manager service (display manager service, DMS). Certainly, the application framework layer may further include an activity manager, a window manager service (window manager service, WMS), a content provider, a view system, a phone manager, a resource manager, a notification manager, and the like. This is not limited in this embodiment of this application.

The display policy service may be used to obtain a touch instruction of the user from the notification manager. Further, the display policy service may display to-be-displayed content on the display, namely, content currently displayed on the display, based on a notification message corresponding to the touch instruction. For example, when the user taps the settings icon 102I, the display policy service displays an application setting interface on the display, to present the interface to the user.

For example, when the user touches the settings icon 102I by using the display, the software system of the mobile phone 10 receives the touch operation by using the touch sensor 180K, and a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control (setting control) corresponding to the input event.

The processor 110 identifies that the touch sensor 180K receives the touch operation (the corresponding application icon tapped by the user), and the display police service displays, on the display, a detailed interface that appears after the application is enabled. When the processor 110 identifies a screen-off instruction sent when the power button of the button 190 is pressed, the display policy service displays a lock screen of a background running program on the display 194. When there are a plurality of lock screens, the display policy service displays the lock screens on the display 194 based on the preset sequence and the preset condition described in the foregoing embodiments.

The WMS is used to manage a window program. The window manager service may obtain a size of the display 194, determine whether there is a status bar, lock the screen of the mobile phone 10, shot a screen, and identify whether a window attribute of an application carries a lock screen application identifier to determine whether the application has a lock screen. The window manager service may monitor a quantity of all currently running lock screen windows, whether content displayed on lock screens corresponding to the lock screen windows changes, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, the display interface may include the lock screen of the music application icon, and may include a text display view and a picture display view.

The phone manager is configured to provide a communication function of the mobile phone 10, for example, management of a call status (including answering, declining, or the like).

The resource manager provides, for an application, various resources such as a localized character string, an icon, a picture, a layout file, and a video file.

The notification manager enables an application to display notification information in the status bar 101 or in the system lock screen 102K. The notification manager may alternatively be a notification that appears in a top status bar of the system in a form of a graph or a scroll bar text, for example, a notification of an application running on the background, or may be a notification that appears on a screen in a form of a dialog window. For example, the notification manager may be a text information prompt in the status bar, a sent alert tone, mobile phone vibration, or indicator flashing.

The Android runtime includes a kernel library and a virtual machine. The Android runtime is responsible for scheduling and management of the Android system.

The kernel library includes two parts: a function that needs to be called in Java language, and a kernel library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGLES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio/video coding formats, such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a display driver, a button driver, a sensor driver, and the like. This is not limited in this embodiment of this application.

In some embodiments, when the mobile phone 10 is in a locked state, a plurality of applications that all can provide lock screens run in the mobile phone 10. The plurality of lock screens of the plurality of applications cover the system lock screen of the mobile phone 10 to form a multi-layer lock screen. For example, when the user runs while listening to music by simultaneously enabling the music application and the exercise application, three layers of lock screens appear after the screen of the mobile phone 10 is locked. The three layers of lock screens are an exercise lock screen 102A0, a music lock screen 102C0, and the system lock screen 102K in sequence.

FIG. 1(*b*) illustrates an example exercise lock screen that is on the mobile phone 10 and that is used to display the exercise application installed in the mobile phone 10.

In FIG. 1(*b*), the exercise lock screen 102A0 displays any one of the following information: the status bar 101 (including at least the signal strength indicator 101A, the battery status indicator 101B, and the time indicator 101C), a content display area 102A00 (including at least an exercise kilometer quantity (for example, 3.01 kilometers), an elevation rising quantity (for example, 1 meter), and duration (for example, 00:30:20)) of the exercise application on the exercise lock screen 102A0, and an unlocking interface display area 102A01. The user may use a finger to upward slide the screen on the touch panel configured for the display of the mobile phone 10, to unlock the exercise lock screen.

FIG. 1(*c*) illustrates an example music lock screen that is on the mobile phone 10 and that is used to display the music application installed in the mobile phone 10.

In FIG. 1(*c*), the music lock screen 102C0 displays at least one of the following information: the status bar 101, a content display area 102C00 (displaying at least currently-played song information 102C001 (such as lyrics, a song name, and a singer), an operation button 102C000, time, a date, and the like) of the music application on the music lock screen 102C0, and an unlocking interface display area 102C01. The user may use a finger to rightward slide the screen on the touch panel configured for the display of the mobile phone 10, to unlock the music lock screen.

FIG. 1(*d*) illustrates an example system lock screen that is on the mobile phone 10 and that is used to display a system application in the mobile phone 10.

In FIG. 1(*d*), the system lock screen 102K may be a Huawei magazine lock screen, and displays at least one of the following information: the status bar 101, an unlocking interface display area 102K0, a content display area 102K1 (which may display notification messages of different applications (such as WeChat, Phone, and Messaging)) of the system lock screen 102K, and a fingerprint unlocking display area 102K2. The user may use a finger to upward slide the screen on the touch panel configured for the display of the mobile phone 10, to unlock the system lock screen, or the user may use a finger to operate the fingerprint unlocking display area 102K2, to unlock the system lock screen.

It may be understood that other content may also be displayed on the lock screens shown in the foregoing embodiment. In addition, lock screens on the mobile phone 10 may further include other types of lock screens, and the user may unlock the lock screen in other manners, such as leftward sliding, rightward sliding, and upward sliding. This is not limited in embodiments of this application. Unlocking manners of the lock screens may be the same or may be different from each other. For example, as shown in FIG. 1*c*, the music lock screen is unlocked through rightward sliding; and as shown in FIG. 1(*d*), the system lock screen is unlocked through upward sliding.

In a running process, if the user wants to view information, such as a name of a currently-played song, displayed on the music lock screen, the user needs to view the information from the music lock screen. However, in this case, if the user wants to view content of a message displayed on the music lock screen, the user needs to first remove the exercise lock screen by using a sliding gesture (for example, through leftward sliding). Only in this way, the user can view the content on the music lock screen. If an application receives a notification message and displays the notification message on the system lock screen, the user needs to view the notification message from the system lock screen. In this case, if the user wants to view content of the message displayed on the system lock screen, the user needs to first "slide upward" to remove (unlock) the exercise lock screen, and then "slide rightward" to remove (unlock) the music lock screen. Only in this way, the user can finally view the content of the message on the system lock screen. The foregoing operations are very cumbersome, and therefore user experience is severely affected.

It may be learned that it is most convenient to view and operate a lock screen displayed at an uppermost layer. When the user needs to view a next-layer lock screen of the lock screen at the uppermost layer, especially when a key event occurs in displayed content of the next-layer lock screen, the user can view content of the next-layer lock screen of the lock screen at the uppermost layer only after removing the lock screen at the uppermost layer. Operations are cumbersome, and therefore user experience is affected.

To help the user more quickly view displayed content on different lock screens and provide the user with a plurality of implementations for lock screen switching, according to some embodiments of this application, when the mobile phone 10 is in a lock screen state, a lock screen with a high sequence level in a plurality of lock screens is first displayed on the screen of the mobile phone 10 as a lock screen 1 based on a preset sequence. When a preset condition is triggered, the mobile phone 10 may determine a target lock screen (a lock screen 2) from the plurality of lock screens based on the preset condition. If the lock screen 1 and the lock screen 2 are of a same application, content of the lock screen 1 of the application may be updated, so that updated content of the lock screen is consistent with content of the lock screen 2. If the lock screen 1 and the lock screen 2 are of different applications, the lock screen 1 may be directly switched, and the lock screen 2 may be switched to an uppermost layer of other lock screens and displayed on the screen of the mobile phone 10. When the mobile phone 10 is on, the target lock screen is displayed on the display of the mobile phone 10, and the user can intuitively view content displayed on the target lock screen without other operations.

The preset sequence may be set based on at least priorities of applications corresponding to the lock screens. A lock screen with a higher priority has a higher corresponding sequence level and is preferentially displayed on the screen of the mobile phone 10.

A setting manner of the priorities of the applications includes at least one of the following manners: The priorities of the applications are customized by the user. The priorities of the applications are set based on access frequency of the user for the applications. The priorities of the applications are set based on a sequence in which the user accesses the applications (a sequence in which the user enables the applications). The priorities of the applications may be set in other manners. This is not limited herein in this embodiment of this application.

For the manner in which the user customizes the priorities, as shown in FIG. 1(*e*), the user operates (for example, taps) the settings 102I on the display provided by the mobile phone 10. The mobile phone 10 presents an application setting interface 102I0 for the user based on an operation instruction of the user. The application setting interface 102I0 includes at least two different applications (in FIG. 1(*e*), the exercise application, the music application, and the system lock screen application are used as an example), and each application is configured to be capable of presenting a corresponding lock screen on the mobile phone 10. The mobile phone 10 sets display priorities of the lock screens based on a sequence in which the user taps (sets) the applications. A lock screen that is set earlier has a higher sequence level, and the lock screen with the higher sequence level also has a higher corresponding priority. For example, if the user sequentially taps the exercise application, the music application, and the system lock screen application, a priority of the exercise application is higher than a priority of the music application, and the priority of the music application is higher than a priority of the system lock screen application. In addition, the priorities may be set by dragging positions of the applications in a queue. For example, an application located on a leftmost side of the screen of the mobile phone has a highest priority, and an application located at a rightmost side of the screen of the mobile phone has a lowest priority.

For the manner in which the priorities are set based on the access frequency of the user for the applications, before the mobile phone 10 enters a lock screen state, the mobile phone 10 sets the priorities based on quantities of times the user accesses the applications corresponding to the lock screens. A lock screen with a larger quantity of access times has a higher priority. For example, the user first taps the music application to enter the interface provided by the music application, and then exits the music application, so that the application runs in the background; and then taps the exercise application to enter the interface provided by the exercise application. In this case, the user first enables the music application, and then enables the exercise application. Therefore, a priority of the music application is higher than a priority of the exercise application.

For the manner in which the priorities are set based on the sequence in which the user accesses the applications, before the mobile phone 10 enters a lock screen state, the mobile phone 10 sets the priorities based on a sequence in which the user enables the applications corresponding to the lock screens, where a lock screen that is enabled earlier has a higher priority.

The preset condition includes at least one of the following rules:

Rule 1: When content displayed on the lock screens changes (content output by the applications changes), the mobile phone 10 uses, as a target lock screen, a lock screen whose content changes, and displays the lock screen on the screen of the mobile phone 10. The change in the content displayed on the lock screen is an update of information presented on the lock screen for the user. For example, the change is song switching or a change in a song name or the like displayed by the operation button 102C000 in the content display area 102C00 on the music lock screen 102C0. For another example, the change is a change in an exercise distance (a switching node such as 5 kilometers or 10 kilometers is reached), a change in a rising elevation (a switching node such as 1 meter or 2 meters is reached), and a change in exercise duration (a switching node such as 1 hour or 2 hours is reached) on the exercise lock screen 102A0. The system lock screen application receives a notification and therefore displays the notification on the system lock screen. This also belongs to the change in the content of the lock screen. For example, the notification is a notification message displayed on a Huawei magazine page.

Rule 2: When the user operates the mobile phone 10, and enables, based on each operation manner of the user, status data of the mobile phone to meet a status data switching requirement corresponding to each operation manner, the mobile phone 10 determines the target lock screen in descending order of sequence levels based on the preset sequence, and displays the target lock screen on the screen of the mobile phone 10 through switching. A manner in which the user operates the mobile phone 10 may include that, for example, the user operates the power button of the mobile phone to enable the mobile phone 10 to switch between a screen-off state and a screen-on state, or the user shakes the mobile phone 10 to enable the mobile phone 10 to generate motion data (which may include a shaking speed). The status data of the mobile phone 10 may include a time difference between a screen-off state and a screen-on state between which the mobile phone 10 is switched by the user by operating the power button of the mobile phone, and the shaking speed of the mobile phone 10. When the time difference meets a switching requirement (a switching requirement 1) or the shaking speed meets a switching requirement (a switching requirement 2), the mobile phone 10 is allowed to switch a lock screen based on the preset sequence. The switching requirement 1 may be that the time difference does not exceed a threshold 1 (for example, 1 second), and the switching requirement 2 may be that the shaking speed exceeds a threshold 2. Specific values of the threshold 1 and the threshold 2 may be determined based on an actual case. This is not limited herein in this embodiment of this application.

Rule 3: The applications corresponding to the lock screens request the mobile phone 10 to use the lock screens of the applications as target lock screens and display the lock screens on the screen of the mobile phone 10. Specifically, when the applications identify that the content on the corresponding lock screens changes, the applications corresponding to the lock screens request the mobile phone to use the lock screens as the target lock screens and display the lock screens on the screen of the mobile phone 10. To prevent a same application from frequently requesting the mobile phone 10 to use a lock screen of the application as a target lock screen, according to some embodiments of this application, within predetermined time, request frequency at which the mobile phone 10 allows a same application to request the mobile phone 10 to use a lock screen of the application as a target lock screen is less than a threshold. For example, a same application can request the mobile phone 10 for a maximum of three times within predetermined time of 1 minute. Certainly, the preset time and the threshold may be other values. This is not limited herein in this embodiment of this application. In addition, the rule 1 may be triggered when the mobile phone 10 is in a screen-off state.

In addition, the manner in which the user operates the mobile phone 10 alternatively includes that the user touches the display of the mobile phone 10. Each time the user touches the display, the user switches one lock screen based on the preset sequence. The touch includes but is not limited to tapping, upward sliding, downward sliding, leftward sliding, rightward sliding, or the like.

It may be understood that other rules may be preset in the preset condition to implement determining and switching of the target lock screen. This is not limited herein in this embodiment of this application.

According to some embodiments of this application, for the rule 2, when a plurality of applications simultaneously request the mobile phone 10 to use lock screens of the applications as target lock screens or displayed content on lock screens of a plurality of applications changes, the mobile phone 10 may choose, based on the preset sequence, to display a lock screen with a high sequence level (ranked top) on the screen of the mobile phone 10 as the target lock screen. For the rule 3, when the user shakes the mobile phone or presses the power button of the mobile phone, the mobile phone may cyclically switch and display the lock screens based on the preset sequence. For example, the exercise lock screen 102A0, the music lock screen 102C0, and the system lock screen 102K are arranged in descending order of sequence levels. The exercise lock screen 102A0 is first displayed on the screen of the mobile phone as a lock screen with a highest sequence level. When the user shakes the mobile phone to trigger the rule 2, the music lock screen 102C0 is switched to the screen of the mobile phone for display. When the user shakes the mobile phone again to trigger the rule 2, the system lock screen 102K is switched to the screen of the mobile phone for display. When the user shakes the mobile phone again to trigger the rule 2, the exercise lock screen 102A0 is switched to the screen of the mobile phone for display again.

According to some embodiments of this application, for the lock screen 1 and the lock screen 2, if an application corresponding to the lock screen 1 triggers at least any one of the rule 1 and the rule 3 in the foregoing rules, the lock screen 2 and the lock screen 1 may be a lock screen of a same application.

According to some embodiments of this application, when a lock screen of a new application is added to the background of the mobile phone 10, based on the manner described in the foregoing embodiment, the lock screen of the new application and the original lock screens are also sorted and switched and displayed in the same manner, that is, based on a preset sequence and a preset condition. Details are not described herein in this embodiment of this application. When an application in the mobile phone 10 currently exits from background running, a process of a lock screen of the application also correspondingly disappears, and the lock screen does not join in a lock screen sorting process and a lock screen switching and display process.

To avoid a problem that a lock screen of another application that triggers the foregoing rule cannot be displayed on the screen of the mobile phone because a target lock screen of a same application is displayed on the display of the mobile phone for long time, according to some embodiments of this application, when only one application triggers the foregoing rule, after time during which the lock screen 2 used as the target lock screen is displayed on the screen of the mobile phone 10 reaches predetermined time, for example, 30 minutes, the mobile phone 10 recovers an original display sequence of the lock screens of the applications based on the preset sequence. For example, after time during which the music lock screen used as the target lock screen is displayed on the screen of the mobile phone 10 reaches 30 minutes, the mobile phone 10 recovers display of the exercise lock screen on the screen of the mobile phone 10 based on the preset sequence. If a plurality of applications trigger the foregoing rule, after time during which the lock screen 2 used as the target lock screen is displayed on the screen of the mobile phone 10 reaches predetermined time, the mobile phone 10 displays a next-sequence-level lock screen of the current target lock screen on the screen of the mobile phone 10 as a new target lock screen through switching based on sequence levels in the preset sequence. For example, after time during which the music lock screen used as the target lock screen is displayed on the screen of the mobile phone 10 reaches 30 minutes, the mobile phone 10 displays the system lock screen on the screen of the mobile phone 10 based on the preset sequence. The predetermined time may be set to any value. This is not limited herein in this embodiment of this application.

In addition, when a plurality of applications trigger the foregoing rule, to avoid a problem that a lock screen of another application cannot be displayed due to cyclical lock screen switching between lock screens at first two high sequence levels, according to some embodiments of this application, after completing sequential switching and display of lock screens of the plurality of applications that trigger the foregoing rule, the mobile phone 10 cyclically switches to the lock screen with the high sequence level. For example, the exercise lock screen used as the lock screen 1 is switched to the music lock screen used as the target lock screen and the music lock screen is displayed on the screen of the mobile phone 10. After time during which the music lock screen is displayed on the screen of the mobile phone 10 reaches 30 minutes, the mobile phone 10 displays, on the screen of the mobile phone 10 through switching, the system lock screen that triggers the preset condition. After time during which the system lock screen is displayed on the screen of the mobile phone 10 reaches 30 minutes, the exercise lock screen is displayed on the screen of the mobile phone 10 through cyclical switching.

According to the lock screen display method provided in this embodiment of this application, before a predetermined rule is triggered, for the plurality of lock screens, the lock screen with the high sequence level in the predetermined sequence is used as the lock screen 1 and displayed on the screen of the mobile phone. After the predetermined rule is triggered, the mobile phone can determine the lock screen 2 from the plurality of lock screens and display the lock screen 2 on the screen. The user can view information on a lock screen and operate the lock screen without unlocking the lock screens one by one. Operations are simple, and therefore user experience is improved.

Figure 1B:
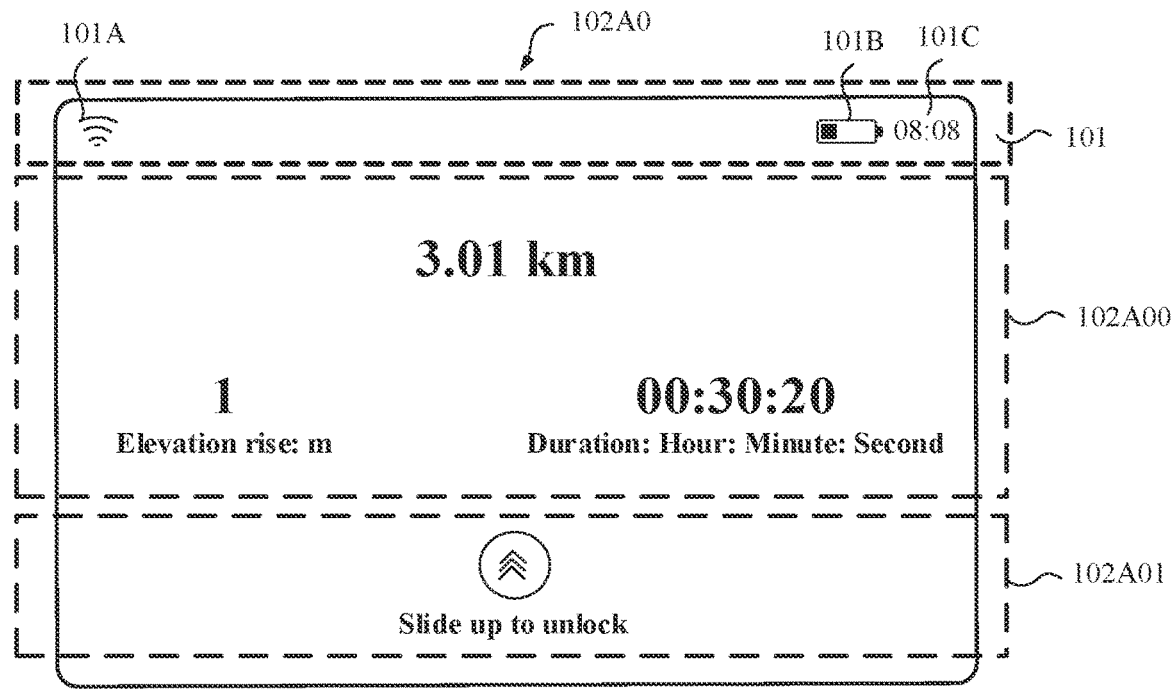
FIG. 1(b) illustrates an example exercise lock screen that is on a mobile phone and that is used to display an exercise application installed in the mobile phone.
Figure 1C:
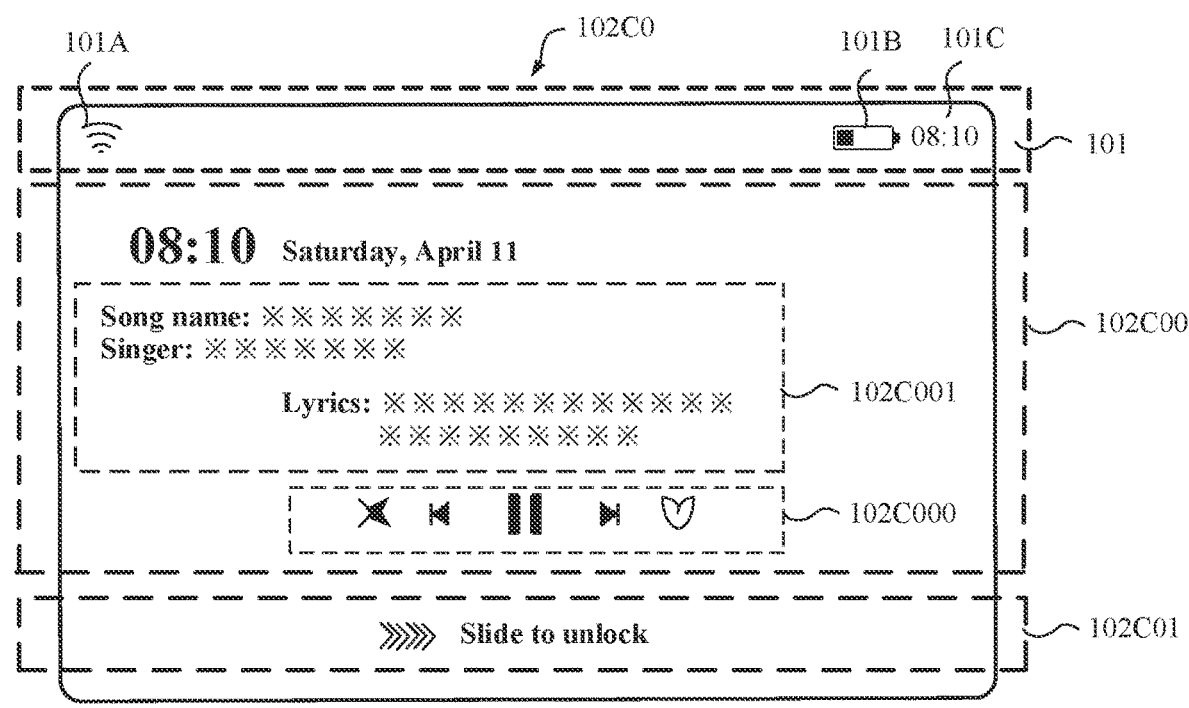
FIG. 1(c) illustrates an example music lock screen that is on a mobile phone and that is used to display a music application installed in the mobile phone.
Figure 1D:
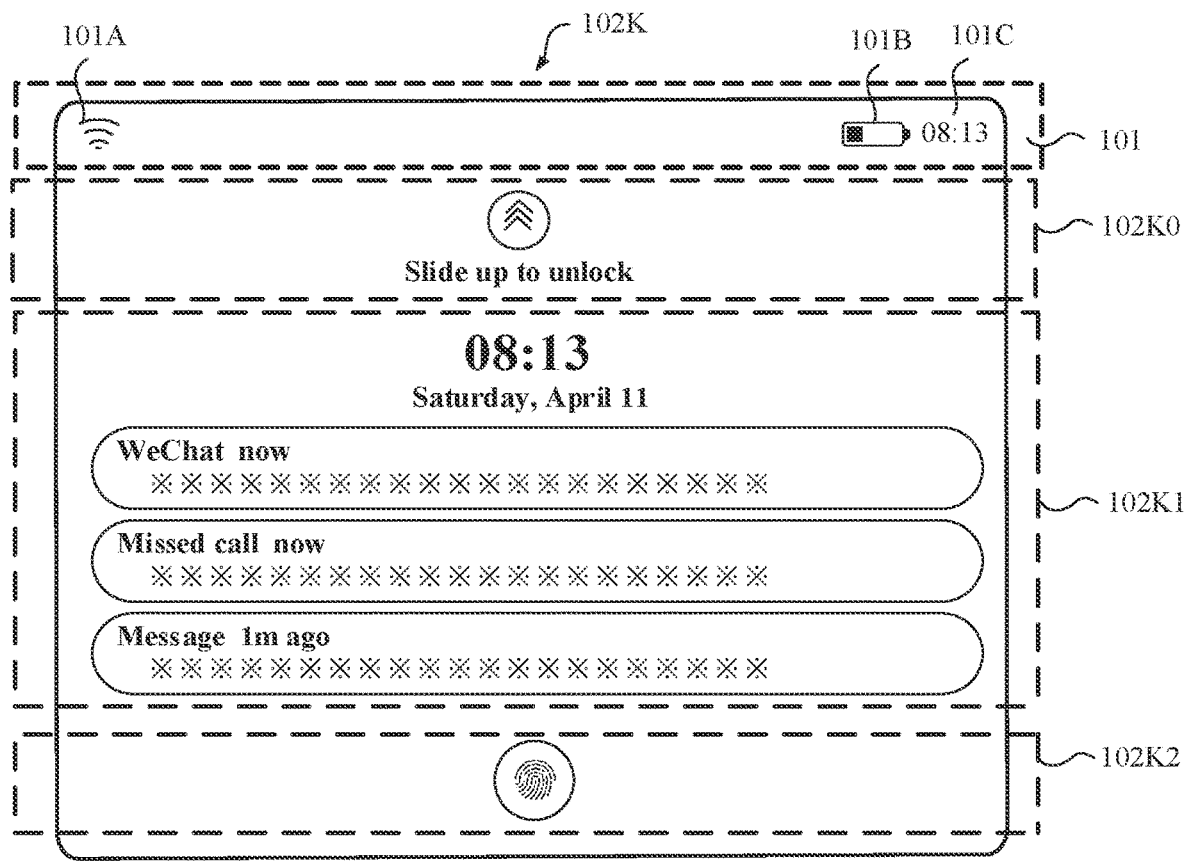
FIG. 1(d) illustrates an example system lock screen that is on a mobile phone and that is used to display a system application in the mobile phone.
Figure 1E:
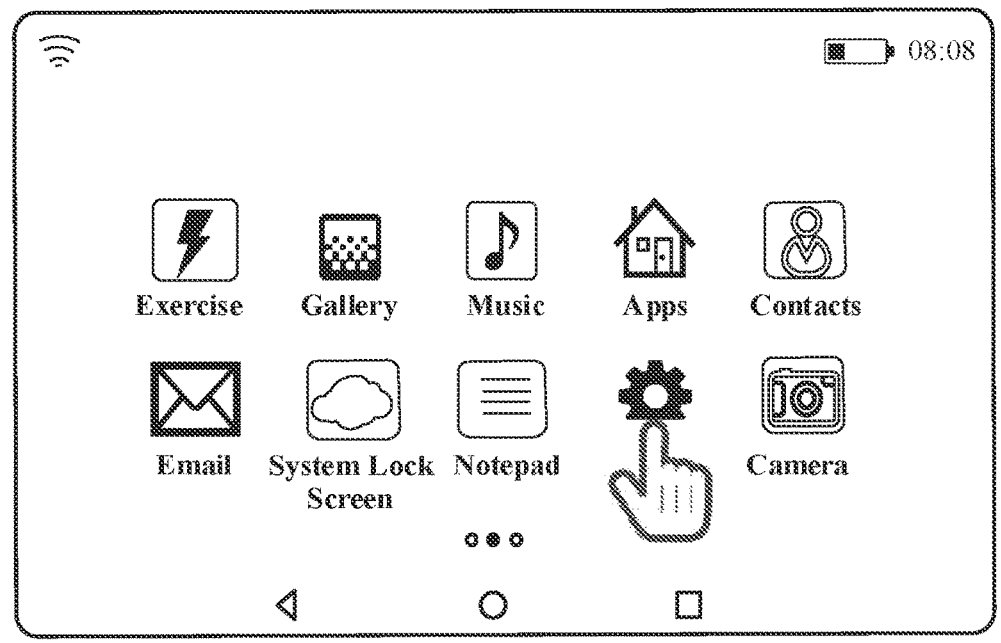
FIG. 1(e) illustrates an application setting interface that is on a mobile phone and that is used to display a settings application installed in the mobile phone.
Figure 1E:
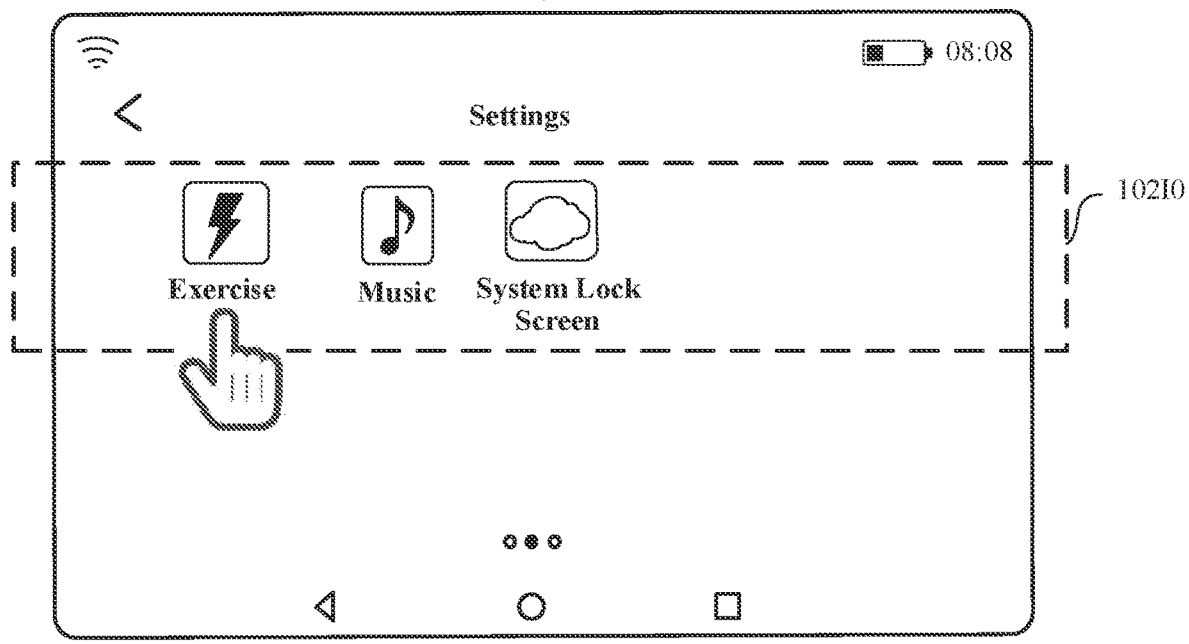

The following uses the lock screens that are displayed on the mobile phone 10 and that are shown in FIG. 1(b), FIG. 1(c), and FIG. 1(d) as an example to describe the lock screen display method provided in this embodiment of this application.

Figure 3A:
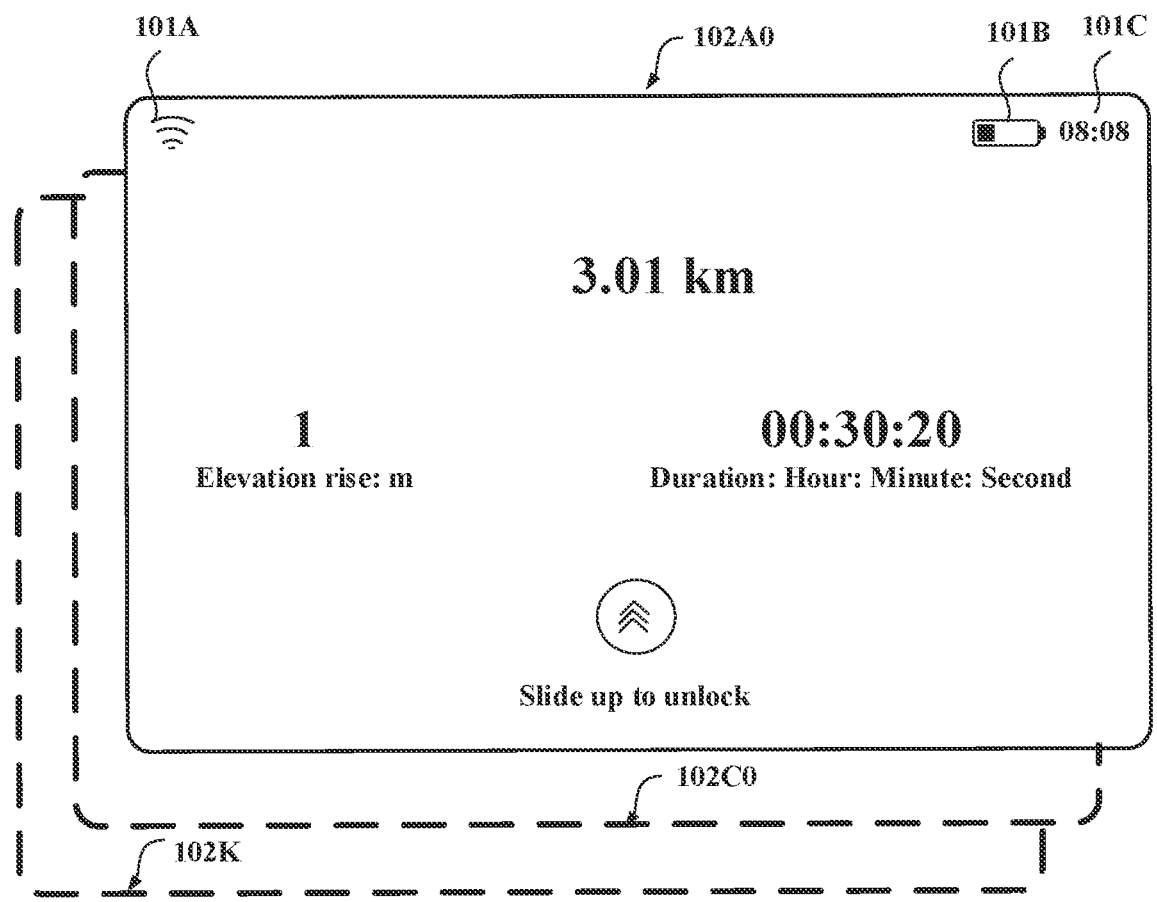
FIG. 3(a) is a schematic diagram 1 of a lock screen displayed on a screen of a mobile phone.

As shown in FIG. 3(a), the memory in the mobile phone 10 stores the three lock screens of the exercise application, the music application, and the system application. The display policy service separately displays the exercise lock screen 102A0, the music lock screen 102C0, and the system lock screen 102K in descending order of sequence levels (in descending order of priorities) in a predetermined sequence. In the predetermined sequence, a lock screen with a highest sequence level is the exercise lock screen, and the exercise lock screen is displayed on the screen of the mobile phone 10 as a lock screen 1. When the mobile phone 10 is on, the exercise lock screen 102A0 is presented for the user. In FIG. 3(a), the exercise lock screen 102A0 displays any one of the following information: the status bar 101 (including at least the signal strength indicator 101A, the battery status indicator 101B, and the time indicator 101C), a content display area 102A00 (including at least an exercise kilometer quantity (for example, 3.01 kilometers), an elevation rising quantity (for example, 1 meter), and duration (for example, 00:30:20)) of the exercise application on the exercise lock screen 102A0, and an unlocking interface display area 102A01. For example, when the user operates the power button of the mobile phone 10 to enable the mobile phone 10 to convert from a screen-off state to a screen-on state, in FIG. 3(a), the user may directly view content displayed on the exercise lock screen 102A0. In addition, the user may use a finger to upward slide the screen on the touch panel configured for the display of the mobile phone 10, to unlock the music lock screen.

The preset sequence may be set based on at least the priorities of the applications corresponding to the lock screens. A lock screen with a higher priority has a higher corresponding sequence level and is preferentially displayed on the screen of the mobile phone 10.

A setting manner of the priorities of the applications includes at least one of the following manners: The priorities of the applications are customized by the user. The priorities of the applications are set based on access frequency of the user for the applications. The priorities of the applications are set based on a sequence in which the user accesses the applications (a sequence in which the user enables the applications). The priorities of the applications may be set in other manners. This is not limited herein in this embodiment of this application. For the manner in which the user customizes the priorities, the user operates (for example, taps) the settings 102I on the display provided by the mobile phone 10. The mobile phone 10 presents an application setting interface for the user based on an operation instruction of the user. The application setting interface 102I0 includes at least two of the exercise application, the music application, and the system application, and each application is configured to be capable of presenting a corresponding lock screen on the mobile phone 10. The mobile phone 10 sets the priorities of the applications based on a sequence in which the user taps (sets) the exercise application, the music application, and the system application, and correspondingly determines display sequence levels of the lock screens of the applications based on the priorities of the applications. A lock screen that is set earlier has a higher sequence level. The lock screens are the exercise lock screen 102A0, the music lock screen 102C0, and the system lock screen 102K in descending order of the sequence levels. That is, a priority of the exercise lock screen 102A0 is higher than a priority of the music lock screen 102C0, and the priority of the music lock screen 102C0 is higher than a priority of the system lock screen 102K.

For the manner in which the priorities are set based on the access frequency of the user for the applications, before the mobile phone 10 enters a lock screen state, the mobile phone 10 sets the priorities based on quantities of times the user accesses the applications corresponding to the lock screens. The lock screens are the exercise lock screen 102A0, the music lock screen 102C0, and the system lock screen 102K in descending order of sequence levels determined based on the quantities of access times. Correspondingly, in descending order of the sequence levels of the lock screens, a priority of the exercise lock screen 102A0 is higher than a priority of the music lock screen 102C0, and the priority of the music lock screen 102C0 is higher than a priority of the system lock screen 102K.

For the manner in which the priorities are set based on the sequence in which the user accesses the applications, before the mobile phone 10 enters a lock screen state, the mobile phone 10 sets the priorities of the applications based on a sequence in which the user enables the applications corresponding to the lock screens, where an application that is enabled earlier has a higher priority, and correspondingly a lock screen of the application with the higher priority has a higher sequence level.

When the preset condition is triggered, the display policy service newly adjusts a display sequence of the exercise lock screen 102A0, the music lock screen 102C0, and the system lock screen 102K on the display 194 of the mobile phone 10 based on the preset condition; and determines a target lock screen from the exercise lock screen 102A0, the music lock screen 102C0, and the system lock screen 102K and displays the target lock screen on the display 194 of the mobile phone 10.

Figure 3B:
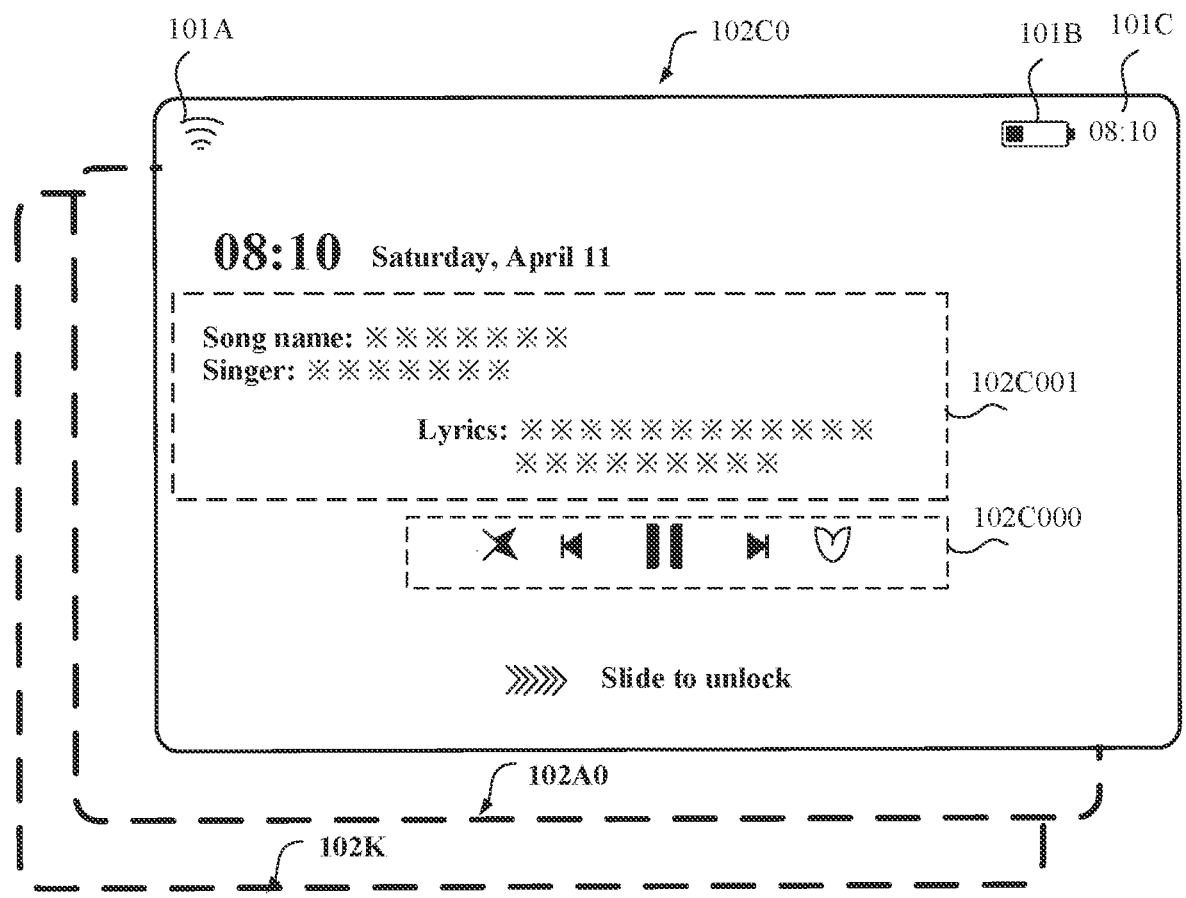
FIG. 3(b) is a schematic diagram 2 of a lock screen displayed on a screen of a mobile phone.

As shown in FIG. 3(b), when the music lock screen 102C0 triggers the preset condition, based on the preset condition, the display policy service determines the music lock screen 102C0 as the target lock screen, and switches the music lock screen 102C0 to the display 194 of the mobile phone 10 for display. The system lock screen 102K is placed at a next layer of the exercise lock screen 102A0 based on the preset sequence. In FIG. 3(b), the music lock screen 102C0 displays at least one of the following information: the status bar 101 (including at least the signal strength indicator 101A, the battery status indicator 101B, and the time indicator 101C), a content display area 102C00 (displaying at least currently-played song information 102C001 (such as lyrics, a song name, and a singer), an operation button 102C000, time, a date, and the like) of the music application on the music lock screen 102C0, and an unlocking interface display area 102C01. For example, when the display policy service switches the music lock screen 102C0 to the display 194 of the mobile phone 10 for display, the mobile phone 10 switches from a screen-off state to a screen-on state, and in FIG. 3(b), the user may directly view content displayed on the music lock screen 102C0. The user may use a finger to rightward slide the screen on the touch panel configured for the display of the mobile phone 10, to unlock the music lock screen.

The following describes the preset condition by using an example in which the lock screens are the exercise lock screen 102A0, the music lock screen 102C0, and the system lock screen 102K.

If the music application corresponding to the music lock screen 102C0 requests the mobile phone 10 to use the music lock screen 102C0 as a target lock screen and display the music lock screen 102C0 on the screen of the mobile phone 10, this rule may be triggered only when the mobile phone 10 is in a screen-off state.

For the rule in which the content displayed on the lock screens changes, the exercise lock screen 102A0 is first displayed on the screen of the mobile phone as a lock screen with a high sequence level. On the music lock screen 102C0, when at least content in the content display area 102C00 (displaying at least currently-played song information 102C001 (such as a song name and a singer)) of the music application on the music lock screen 102C0 changes, or the operation button 102C000 displays song switching, the mobile phone 10 uses the music lock screen 102C0 as a target lock screen and displays the music lock screen 102C0 on the screen of the mobile phone 10.

According to some embodiments of this application, when displayed content on the music application lock screen and the system application lock screen changes (for example, a notification message of another application is newly added), the mobile phone 10 may choose, based on the preset sequence, to display the music lock screen 102C0 with a higher lock screen sequence level (a higher priority of the corresponding application) on the screen of the mobile phone 10 as a target lock screen (the lock screen 2).

For the rule based on different operation manners of the user, when the user operates the mobile phone 10, and enables, based on each operation manner of the user, status data of the mobile phone 10 to meet a corresponding status data switching requirement, the display policy service of the mobile phone 10 sequentially determines the music lock screen 102C0 and the system lock screen 102K as target lock screens based on the preset sequence and sequence levels of the exercise lock screen 102A0, the music lock screen 102C0, and the system lock screen 102K, and performs switching.

For example, the user operates the power button of the mobile phone 10 to enable the mobile phone 10 to switch between a screen-off state and a screen-on state, and the window manager service identifies the screen-off state and the screen-on state of the mobile phone 10. For example, when the user continuously presses the power button of the mobile phone 10 twice, and a time difference of the mobile phone 10 between a screen-off state and a screen-on state does not exceed 1 second, the display policy service of the mobile phone 10 switches the music lock screen 102C0 to the screen of the mobile phone 10 for display. When the user continuously presses the power button of the mobile phone 10 twice again, and a time difference of the mobile phone 10 between a screen-off state and a screen-on state does not exceed 1 second, the display policy service of the mobile phone 10 switches the system lock screen 102K to the screen of the mobile phone 10 for display. When the user continuously presses the power button of the mobile phone 10 twice again, and a time difference of the mobile phone 10 between a screen-off state and a screen-on state does not exceed 1 second, the display policy service of the mobile phone 10 cyclically switches the exercise lock screen 102A0 to the screen of the mobile phone 10 again for display.

Further, for example, when the user shakes the mobile phone 10 to enable motion data such as a shaking speed or a shaking acceleration that is of the mobile phone 10 and that is measured by the gyroscope sensor 180B, the acceleration sensor 180E, and the gravity sensor of the mobile phone 10 to change, the mobile phone 10 switches a lock screen based on motion data. For example, when the user shakes the mobile phone 10 up and down as a shaking period, and a shaking speed of the mobile phone 10 exceeds a threshold 2 (a switching threshold) or a shaking acceleration of the mobile phone 10 exceeds a threshold 3, the display policy service of the mobile phone 10 switches the music lock screen 102C0 to the screen of the mobile phone 10 for display. When the user shakes the mobile phone 10 again as a next shaking period, and a shaking speed of the mobile phone 10 exceeds the threshold 2 again or a shaking acceleration of the mobile phone 10 exceeds the threshold 3, the display policy service of the mobile phone 10 switches the system lock screen 102K to the screen of the mobile phone 10 for display. The lock screens are cyclically displayed. The manner in which the lock screen is switched based on the motion data may be performed only when the mobile phone 10 is in a screen-on state. The threshold 2 and the threshold 3 may be customized based on empirical values. Specific values of the threshold 2 and the threshold 3 are not limited in this application.

According to some embodiments of this application, for the lock screen 1 and the lock screen 2, if the exercise application corresponding to the lock screen 1 triggers at least any one of the foregoing rules, the exercise lock screen 102A0 may continue to be displayed on the screen of the mobile phone 10 as the lock screen 2. For example, the exercise application may trigger the rule 1 when the exercise application broadcasts a change in an exercise distance (the rule may be triggered when an exercise distance reaches a trigger node (such as 1 kilometer, 5 kilometers, or 15 kilometers)), a change in a rising elevation (the change may be that a rising elevation reaches a trigger node (for example, an elevation rises or falls by 1 meter)), a change in exercise duration (the change may be that exercise duration reaches a trigger node (such as 30 minutes or 60 minutes)), or the like.

To avoid a problem that other lock screens that are the music lock screen 102C0 and the system lock screen 102K and that trigger the foregoing rule cannot be displayed on the screen of the mobile phone because the exercise lock screen 102A0 of the exercise application is displayed on the display of the mobile phone for long time, after time during which the exercise lock screen 102A0 is displayed on the screen of the mobile phone 10 reaches predetermined time (for example, 3 minutes), the mobile phone 10 displays the music lock screen 102C0 on the screen of the mobile phone 10 through switching based on the sequence levels in the preset sequence. The exercise lock screen 102A0 is at a next sequence level of the music lock screen 102C0, and the system lock screen 102K is at the last sequence level.

To avoid a problem that the system lock screen 102K that triggers the foregoing rule cannot be displayed due to cyclical lock screen switching between the exercise lock screen 102A0 and the music lock screen 102C0, the mobile phone 10 cyclically switches, based on the preset sequence, the exercise lock screen 102A0, the music lock screen 102C0, and the system lock screen 102K that trigger the foregoing rule. Only after the system lock screen 102K is used as the lock screen 2 through switching, the lock screen can be cyclically switched to the exercise lock screen 102A0.

According to the lock screen display method provided in this embodiment of this application, before a predetermined rule is triggered, for the plurality of lock screens, the lock screen with the high sequence level in the predetermined sequence is used as the lock screen 1 and displayed on the screen of the mobile phone. After the predetermined rule is triggered, the mobile phone can determine the lock screen 2 from the plurality of lock screens and display the lock screen 2 on the screen. The user can view information on a lock screen and operate the lock screen without unlocking the lock screens one by one. Operations are simple, and therefore user experience is improved.

Figure 4A:
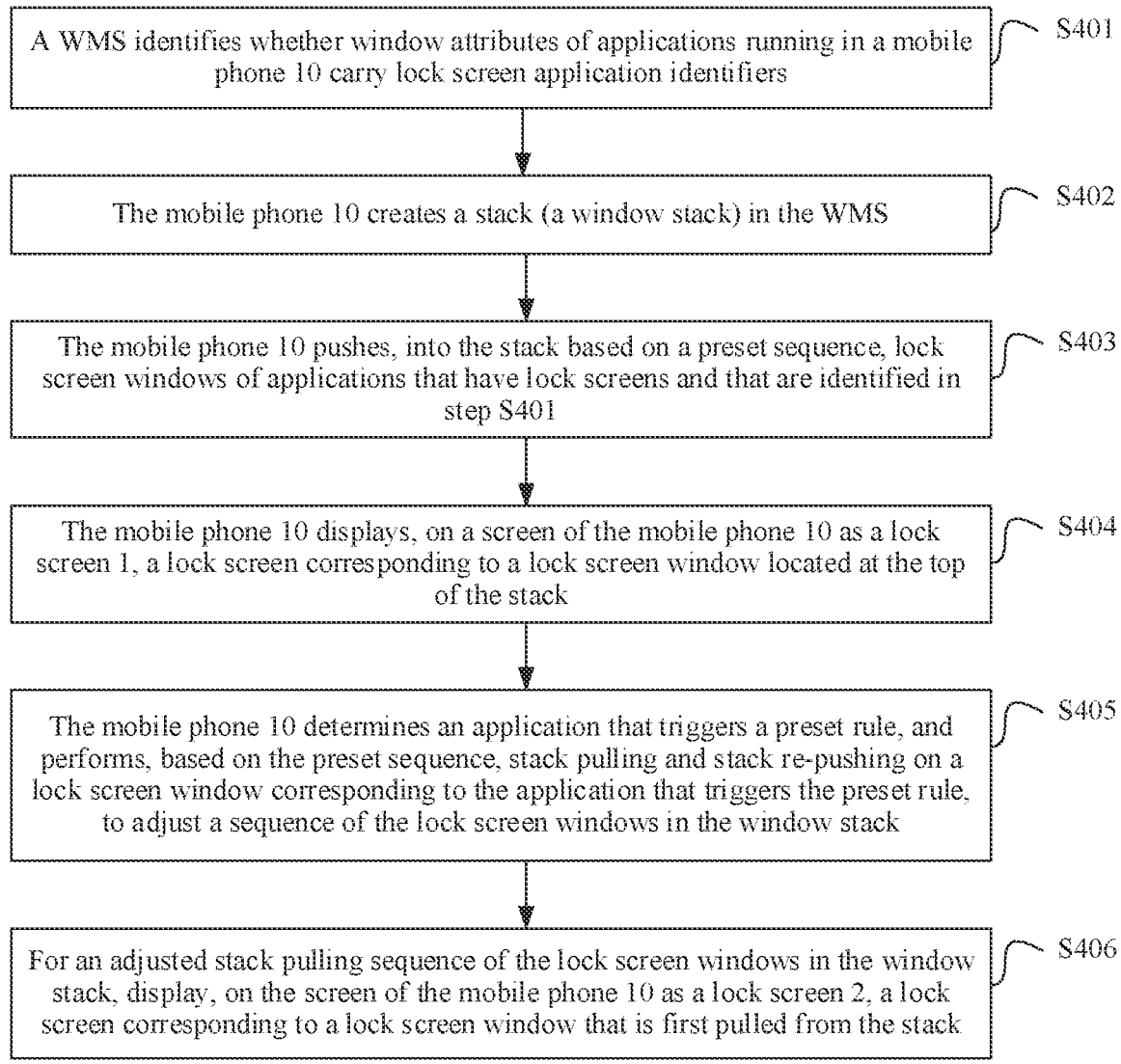
FIG. 4(a) is a schematic flowchart of a lock screen display method according to an embodiment of this application.

The following further describes, with reference to FIG. 4(a), the lock screen display method shown in FIG. 3(a) and FIG. 3(b).

As shown in FIG. 4(a), the lock screen display method includes the following steps.

Step S401: The WMS identifies whether window attributes of applications running in the mobile phone 10 carry lock screen application identifiers. For an application that carries a lock screen application identifier, it is determined that the application has a lock screen. For an application that carries no lock screen application identifier, it is determined that the application has no lock screen. The lock screen application identifier may be set to the following format: Window Manager.Layout Params.FLAG_SHOW_WHEN_LOCKED, and an application whose window attribute carries a Window Manager.Layout Params.FLAG_SHOW_WHEN_LOCKED field may be considered as an application having a lock screen. Certainly, the lock screen application identifier may be alternatively of another type. This is not limited in this embodiment of this application.

For example, if the WMS identifies that window attributes of a music application, an exercise application, and a system lock screen application in running applications on the mobile phone 10 each carry the Window Manager.Layout Params.FLAG_SHOW_WHEN_LOCKED field, the WMS determines that the music application, the exercise application, and the system lock screen application have lock screens.

Step S402: The mobile phone 10 creates a stack (a window stack) in the WMS. The stack is used to store lock screen windows corresponding to lock screens. The stack is specifically created based on a linked list.

Step S403: The mobile phone 10 pushes, into the stack based on a preset sequence, lock screen windows of applications that have lock screens and that are identified in step S401. Specifically, the lock screen windows are pushed into the stack in ascending order of priorities of the applications. That is, a lock screen window of an application with a lower sequence level (a lower priority) is first pushed into the stack and is located at the bottom of the stack, and a lock screen window of an application with a higher sequence level (a higher priority) is last pushed into the stack and is located at the top of the stack. A lock screen window that is first pushed into the stack is last pulled from the stack. A lock screen window located at the top of the stack is first pulled from the stack, and a corresponding lock screen is first displayed on the screen of the mobile phone 10. A lock screen window located at the bottom of the stack is last pulled from the stack, and a corresponding lock screen is last displayed on the screen of the mobile phone 10. That is, a stack pulling sequence of the lock screen windows is a preset sequence of the applications.

The preset sequence may be set based on at least the priorities of the applications corresponding to the lock screens. A lock screen with a higher priority has a higher corresponding sequence level and is preferentially displayed on the screen of the mobile phone 10.

A setting manner of the priorities of the applications includes at least one of the following manners: The priorities of the applications are customized by the user. The priorities of the applications are set based on access frequency of the user for the applications. The priorities of the applications are set based on a sequence in which the user accesses the applications (a sequence in which the user opens the applications). The priorities of the applications may be set in other manners. This is not limited in this embodiment of this application.

For the manner in which the user customizes the priorities, as shown in FIG. 1(*e*), the user operates (for example, taps) the settings 102I on the display provided by the mobile phone 10, and the touch sensor of the mobile phone detects a touch instruction. The mobile phone 10 presents an application setting interface 102I0 for the user based on the touch instruction of the user. The application setting interface 102I0 includes at least two different applications (in FIG. 1(*e*), the exercise application, the music application, and the system lock screen application are used as an example), and each application is configured to be capable of presenting a corresponding lock screen on the mobile phone 10. The mobile phone 10 identifies, based on touch instructions transmitted by the touch sensor, application identifiers and touch time of the applications tapped (set) by the user; and correspondingly sets the priorities of the applications based on a touch time sequence. An application corresponding to an application identifier with earlier touch time has a higher priority, and a lock screen of the application with the higher priority has a higher sequence level. For example, if the mobile phone identifies an exercise application identifier, a music application identifier, and a system lock screen application identifier in a time sequence based on the touch instructions transmitted by the touch sensor, a priority of the exercise application corresponding to the exercise application identifier is higher than a priority of the music application corresponding to the music application identifier, and the priority of the music application corresponding to the music application identifier is higher than a priority of the system lock screen application corresponding to the system lock screen application identifier.

For the manner in which the priorities are set based on the access frequency of the user for the applications, before the mobile phone 10 enters a lock screen state, the mobile phone 10 collects statistics on occurrence frequency (corresponding to quantities of times the user taps the applications (quantities of access times)) of the application identifiers of the applications based on the touch instructions transmitted by the touch sensor, to set the priorities of the applications. A lock screen with higher occurrence frequency has a higher priority.

Figure 4B:
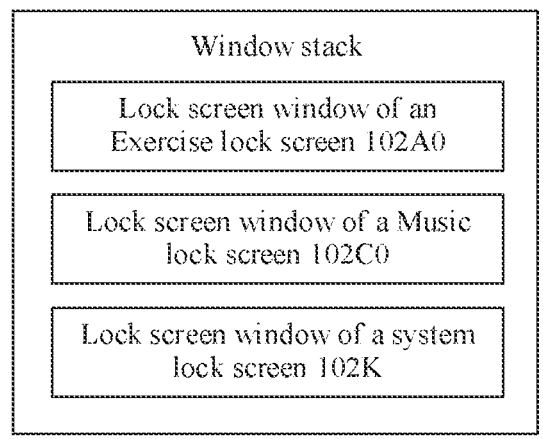
FIG. 4(b) is a schematic diagram 1 of a specific implementation of a window stack.
Figure 4C:
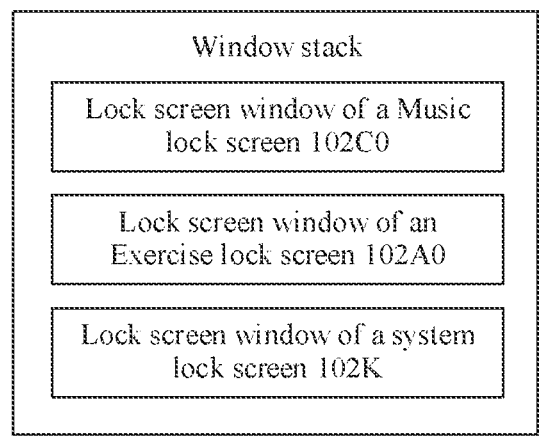
FIG. 4(c) is a schematic diagram 2 of a specific implementation of a window stack.

For example, as shown in FIG. 3(*a*) and FIG. 3(*b*), a priority of the exercise lock screen 102A0 is higher than a priority of the music lock screen 102C0, and the priority of the music lock screen 102C0 is higher than a priority of the system lock screen 102K. As shown in FIG. 4(*b*), the mobile phone 10 first pushes a lock screen window of the system lock screen 102K into the stack and enables the lock screen window to be located at the bottom of the stack; then pushes a lock screen window of the music lock screen 102C0 into the stack and enables the lock screen window to be located above the lock screen window of the system lock screen 102K; and finally pushes a lock screen window of the exercise lock screen 102A0 into the stack and enables the lock screen window to be located at the top of the stack. The exercise lock screen 102A0 located at the top of the stack is first displayed on the screen of the mobile phone 10.

Step S404: The mobile phone 10 displays, on the screen of the mobile phone 10 as a lock screen 1, a lock screen corresponding to a lock screen window located at the top of the stack.

For example, as shown in FIG. 3(*a*) and FIG. 3(*b*), the exercise lock screen 102A0 is located at the top of the stack. In this case, the exercise lock screen 102A0 is first displayed on the screen of the mobile phone 10 as a lock screen 1 with a high sequence level.

Step S405: The mobile phone 10 determines an application that triggers a preset condition, and performs, based on the preset sequence, stack pulling and stack re-pushing on a lock screen window corresponding to the application that triggers the preset condition, to adjust a sequence of the lock screen windows in the window stack.

Step S406: For an adjusted stack pulling sequence of the lock screen windows in the window stack, display, on the screen of the mobile phone 10 as a lock screen 2, a lock screen corresponding to a lock screen window that is first pulled from the stack.

For example, as shown in FIG. 3(*a*) and FIG. 3(*b*), when the music lock screen 102C0 triggers the preset condition or the system lock screen 102K and the music lock screen 102C0 simultaneously trigger the preset condition, the display policy service determines the music lock screen 102C0 as a target lock screen (the lock screen 2) based on the preset condition.

The mobile phone 10 performs a stack pulling operation on the lock screen window of the exercise lock screen 102A0 and the lock screen window of the music lock screen 102C0 in the window stack, so that the lock screen window of the exercise lock screen 102A0 and the lock screen window of the music lock screen 102C0 are pulled from the stack. The position of the system lock screen 102K in the window stack remains unchanged, that is, the system lock screen 102K is still located at the bottom of the stack.

As shown in FIG. 4(*c*), the mobile phone 10 first pushes, into the window stack, the lock screen window that is of the exercise lock screen 102A0 and that is pulled from the stack and enables the lock screen window to be located above the lock screen window of the system lock screen 102K; and then pushes, into the window stack, the lock screen window that is of the music lock screen 102C0 and that is pulled from the stack and enables the lock screen window to be located at the top of the stack. The music lock screen 102C0 is displayed on the screen of the mobile phone 10 as the lock screen 2.

It may be understood that when the exercise lock screen 102A0 triggers the preset condition, the system lock screen 102K, the music lock screen 102C0, and the exercise lock screen 102A0 trigger the preset condition, the exercise lock screen 102A0 and the music lock screen 102C0 trigger the preset condition, or the exercise lock screen 102A0 and the system lock screen 102K trigger the preset condition, the sequence of the lock screen windows in the window stack remains unchanged, and the exercise lock screen 102A0 is still first pulled from the stack and displayed on the screen of the mobile phone 10 as the lock screen 2, that is, the lock screen 1 and the lock screen 2 are lock screens of a same application. When the system lock screen 102K triggers the preset condition, the display policy service determines the system lock screen 102K as a target lock screen (the lock screen 2) based on the preset condition, and performs stack pulling on the lock screen window of the exercise application, the lock screen window of the music application, and the lock screen window of the system lock screen application in the window stack; then, based on the preset sequence, first pushes the lock screen window of the music application into the stack and enables the lock screen window to be located at the bottom of the stack, and then pushes the lock screen window of the exercise application into the stack and enables the lock screen window to be located above the lock screen window of the music application; and finally, pushes the lock screen window of the system lock screen application into the stack and enables the lock screen window to be located at the top of the stack.

The following describes the preset condition by using an example in which the lock screens are the exercise lock screen 102A0, the music lock screen 102C0, and the system lock screen 102K.

The music application corresponding to the music lock screen 102C0 requests the mobile phone 10 to use the music lock screen 102C0 as the target lock screen. The mobile phone pulls the exercise lock screen 102A0 and the music lock screen 102C0 from the stack; and then pushes the exercise lock screen 102A0 into the stack again, and pushes the music lock screen 102C0 into the top of the window stack and displays the music lock screen 102C0 on the screen of the mobile phone 10 through switching. It should be noted that this may be triggered only when the mobile phone 10 is in a screen-off state.

For a rule in which the content displayed on the lock screens changes, the mobile phone first determines, based on the preset sequence, to first display, on the screen of the mobile phone as a lock screen with a high sequence level, the exercise lock screen 102A0 of the exercise application corresponding to the exercise application identifier. On the music lock screen 102C0, when at least content in the content display area 102C00 (displaying at least currently-played song information 102C001 (such as a song name and a singer)) of the music application on the music lock screen 102C0 changes, or the operation button 102C000 displays song switching, the mobile phone pulls the exercise lock screen 102A0 and the music lock screen 102C0 from the window stack; and then pushes the exercise lock screen 102A0 into the stack again, and pushes the music lock screen 102C0 into the top of the window stack and displays the music lock screen 102C0 on the screen of the mobile phone 10 through switching.

According to some embodiments of this application, when the window manager service of the mobile phone monitors a change in displayed content on the music application lock screen and the system application lock screen (for example, a notification message of another application is newly added), the mobile phone 10 may choose, based on the preset sequence, to display the music lock screen 102C0 with a high sequence level on the screen of the mobile phone 10 as a target lock screen (the lock screen 2).

For a rule based on different operation manners of the user, the mobile phone first determines, based on the preset sequence, to first display, on the screen of the mobile phone as a lock screen with a high sequence level, the exercise lock screen 102A0 of the exercise application corresponding to the exercise application identifier.

The user operates the mobile phone 10 (for example, shakes the mobile phone or continuously presses the power button), and the mobile phone 10 receives signals transmitted by the acceleration sensor, the gravity sensor, and/or the gyroscope sensor, or a button module. The mobile phone 10 determines whether motion data corresponding to the signals meets a switching requirement. For example, if the motion data is a shaking speed or a shaking acceleration and changes, and the user shakes the mobile phone 10 up and down as a shaking period, the mobile phone 10 switches a lock screen when the motion data meets the switching requirement. For example, the user shakes the mobile phone as a shaking period, and the mobile phone 10 receives signals transmitted by the gyroscope sensor 180B, the acceleration sensor 180E, and the gravity sensor. In the signals, when a shaking speed of the mobile phone 10 exceeds a threshold 2 (a switching threshold) or a shaking acceleration of the mobile phone 10 exceeds a threshold 3, the display policy service of the mobile phone 10 sequentially determines the music lock screen 102C0 and the system lock screen 102K as target lock screens based on the preset sequence and sequence levels of the exercise lock screen 102A0, the music lock screen 102C0, and the system lock screen 102K, and performs switching. That is, when the user shakes the mobile phone once and motion data meets the switching requirement, the mobile phone 10 first pulls the exercise lock screen 102A0, the music lock screen 102C0, and the system lock screen 102K from the stack; and then, first pushes the exercise lock screen 102A0 into the bottom of the window stack, pushes the system lock screen 102K into the window stack and enables the system lock screen 102K to be located above the exercise lock screen 102A0, and finally pushes the music lock screen 102C0 into the top of the window stack and displays the music lock screen 102C0 on the screen of the mobile phone 10. When the user shakes the mobile phone again as a next shaking period and motion data meets the switching requirement, the mobile phone 10 first pulls the music lock screen 102C0 and the system lock screen 102K from the stack; and then, pushes the music lock screen 102C0 into the window stack and enables the music lock screen 102C0 to be located above the exercise lock screen 102A0, and finally pushes the system lock screen 102K into the top of the window stack and displays the system lock screen 102K on the screen of the mobile phone 10. The lock screens are cyclically displayed. The manner in which the lock screen is switched based on the motion data may be performed only when the mobile phone 10 is in a screen-on state.

For example, the user operates the power button of the mobile phone 10 to enable the mobile phone 10 to switch between a screen-off state and a screen-on state, and the window manager service identifies the screen-off state and the screen-on state of the mobile phone 10. Specifically, the window manager service monitors a screen-off broadcast android.intent.action.SCREEN_OFF to implement determining of screen-off of the mobile phone 10; and the window manager service monitors a screen-on broadcast android.intent.action.SCREEN_ON to implement determining of screen-on of the mobile phone 10. For example, when the user continuously presses the power button of the mobile phone 10 twice, the mobile phone determines a time difference between monitored screen-off broadcast android.intent.action.SCREEN_OFF and screen-on broadcast android.intent.action.SCREEN_ON. When the time difference does not exceed 1 second, the display policy service of the mobile phone 10 performs stack pulling and stack re-pushing operations on the exercise lock screen 102A0 and the music lock screen 102C0, to push the music lock screen 102C0 into the top of the window stack to switch the music lock screen 102C0 to the screen of the mobile phone 10 for display.

When the user continuously presses the power button of the mobile phone 10 twice again, the mobile phone determines a time difference between monitored screen-off broadcast android.intent.action.SCREEN_OFF and screen-on broadcast android.intent.action.SCREEN_ON. When the time difference does not exceed 1 second, the display policy service of the mobile phone 10 switches the system lock screen 102K to the screen of the mobile phone 10 for display. When the user continuously presses the power button of the mobile phone 10 twice again, the mobile phone determines a time difference between monitored screen-off broadcast android.intent.action.SCREEN_OFF and screen-on broadcast android.intent.action.SCREEN_ON. When the time difference does not exceed 1 second, the display policy service of the mobile phone 10 cyclically switches the exercise lock screen 102A0 to the screen of the mobile phone 10 again for display.

It should be noted that, after time during which the lock screen 1 and the lock screen 2 are displayed on the screen reaches predetermined time, the lock screen windows in the window stack are resorted based on the preset sequence.

For example, as shown in FIG. 3(*a*) and FIG. 3(*b*), after the exercise lock screen 102A0 reaches predetermined time on the mobile phone 10, the mobile phone 10 performs a stack pulling operation on the lock screen window of the exercise lock screen 102A0 and the lock screen window of the music lock screen 102C0 in the window stack. The lock screen window of the system lock screen 102K is still located at the bottom of the window stack. The mobile phone 10 pushes the lock screen window of the exercise lock screen 102A0 into the window stack, and finally pushes the lock screen window of the music lock screen 102C0 into the top of the window stack and displays the music lock screen 102C0 on the screen of the mobile phone 10. This avoids a problem that a screen resource of the mobile phone is occupied because the exercise lock screen 102A0 used as the lock screen 1 is displayed on the screen of the mobile phone 10 for long time.

According to the lock screen display method provided in this embodiment of this application, before a predetermined rule is triggered, for the plurality of lock screens, the lock screen with the high sequence level in the predetermined sequence is used as the lock screen 1 and first pulled from the stack and displayed on the screen of the mobile phone. After the predetermined rule is triggered, the mobile phone can determine the lock screen 2 from the plurality of lock screens and first pull the lock screen 2 from the stack and display the lock screen 2 on the screen. The user can view information on a lock screen and operate the lock screen without unlocking the lock screens one by one. Operations are simple, and therefore user experience is improved.

Figure 5:
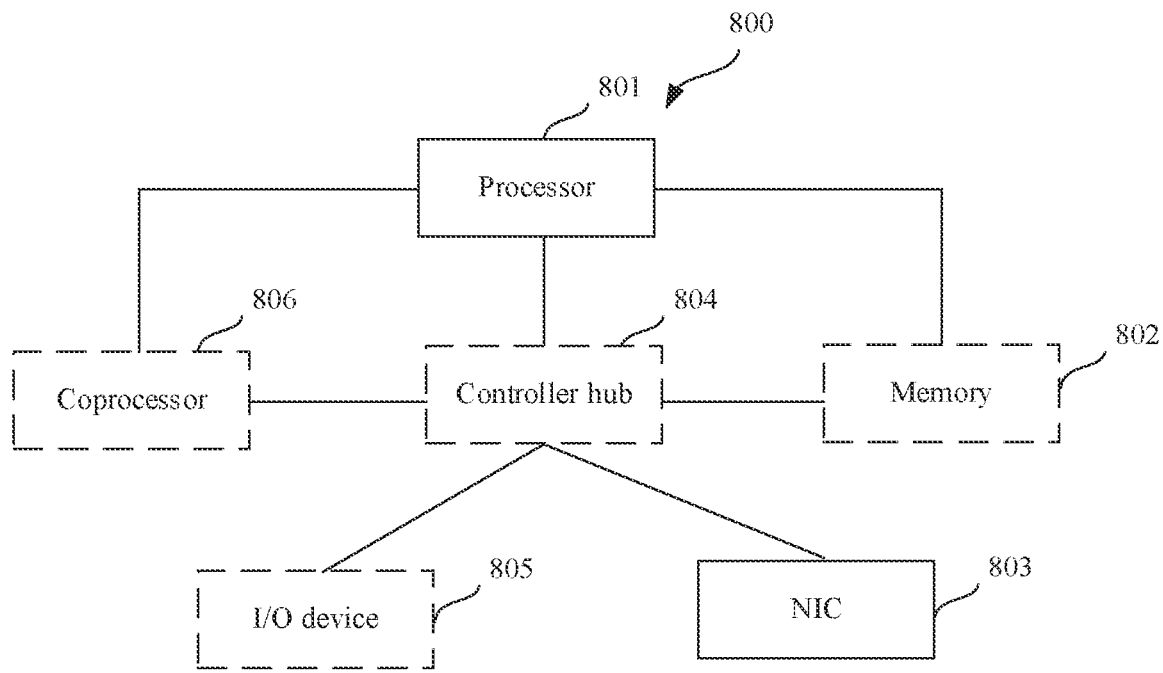
FIG. 5 is a schematic diagram of a structure of an electronic device according to an embodiment of this application.

In some embodiments of this application, an electronic device is further provided. The following describes the electronic device in the embodiments of this application with reference to FIG. 5. FIG. 5 is a schematic diagram of a structure of an electronic device according to an embodiment of this application.

For at least one embodiment, a controller hub 804 communicates with a processor 801 by using a multi-branch bus such as a front side bus (FSB), a point-to-point interface such as quick path interconnect (QPI), or a similar connection. The processor 801 executes an instruction for controlling a data processing operation of a general type. In an embodiment, the controller hub 804 includes, but is not limited to, a graphics & memory controller hub (GMCH) (not shown in the figure) and an input output hub (IOH) (which may be on separate chips) (not shown in the figure). The GMCH includes a memory and a graphics controller and is coupled to the IOH.

The electronic device 800 may further include a coprocessor 806 and a memory 802 that are coupled to the controller hub 804. Alternatively, one or both of the memory 802 and the GMCH may be integrated into the processor 801 (as described in this application), the memory 802 and the coprocessor 806 are directly coupled to the processor 801 and the controller hub 804, and the controller hub 804 and the IOH are located in a single chip.

In an embodiment, the memory 802 may be, for example, a dynamic random access memory (DRAM), a phase change memory (PCM), or a combination thereof. The memory 802 may include one or more tangible non-temporary computer readable media configured to store data and/or instructions. The computer readable storage medium stores instructions, and specifically, stores temporary and permanent copies of the instructions.

In an embodiment, the coprocessor 806 is a dedicated processor, such as a high throughput MIC processor, a network or communications processor, a compression engine, a graphics processor, a GPU, or an embedded processor. An optional property of the coprocessor 806 is represented by a dashed line in FIG. 5.

In an embodiment, the electronic device 800 may further include a network interface (NIC) 803. The network interface 803 may include a transceiver, configured to provide a radio interface for the device 800 to communicate with any other suitable device (for example, a front-end module or an antenna). In various embodiments, the network interface 803 may be integrated with another component of the electronic device 800. The network interface 803 may implement a function of the communications unit in the foregoing embodiment.

In an embodiment, as shown in FIG. 5, the electronic device 800 may further include an input/output (I/O) device 805. The input/output (I/O) device 805 may include: a user interface, where the design enables a user to interact with the electronic device 800; a peripheral component interface, where the design enables a peripheral component to also interact with the electronic device 800; and/or a sensor, where the design is used to determine an environmental condition and/or position information related to the electronic device 800.

It should be noted that FIG. 5 is merely an example. That is, although FIG. 5 shows that the electronic device 800 includes a plurality of components such as the processor 801, the controller hub 804, and the memory 802, in actual application, a device that uses the methods in this application may include only a part of the components of the electronic device 800, for example, may include only the processor 801 and the NIC 803. Properties of optional components in FIG. 5 are shown by using dashed lines.

In some embodiments of this application, the instructions stored in the computer readable storage medium of the electronic device 800 may include instructions causing the device to implement the lock screen display method for the electronic device in the foregoing embodiments when being executed by at least one unit in the processor. When the instructions run on a computer, the computer is enabled to perform the foregoing lock screen display method for the electronic device in the foregoing embodiments.

Figure 6:
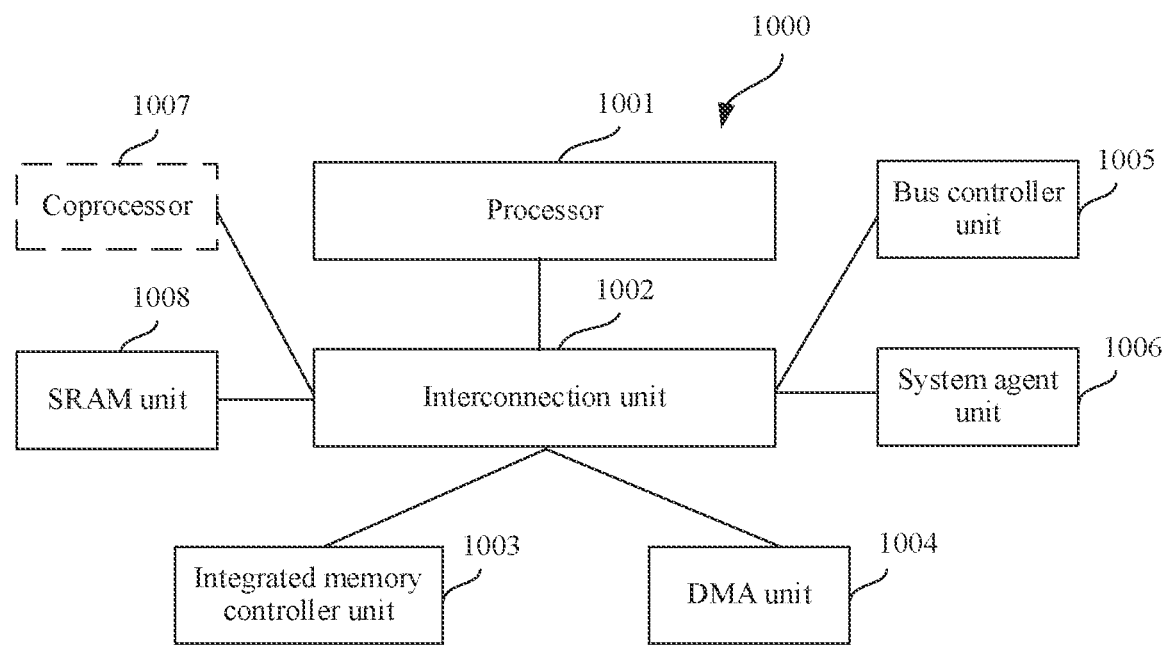
FIG. 6 is a schematic diagram of a structure of an SoC according to an embodiment of this application.

Now, refer to FIG. 6. FIG. 6 is a schematic diagram of a structure of an SoC according to an embodiment of this application. FIG. 6 is a block diagram of an SoC (System on Chip, System on Chip) 1000 according to an embodiment of this application. In FIG. 6, similar components have same reference signs. In addition, a dashed line box is an optional feature of a more advanced SoC. The SoC may be used in an electronic device according to an embodiment of this application, and may implement corresponding functions based on instructions stored in the SoC.

In FIG. 6, the SoC 1000 includes: an interconnection unit 1002, coupled to a processor 1001: a system agent unit 1006; a bus controller unit 1005; an integrated memory controller unit 1003; a group of or one or more coprocessors 1007, which may include integrated graphics logic, an image processor, an audio processor, and a video processor; a static random access memory (SRAM) unit 1008; and a direct memory access (DMA) unit 1004. In an embodiment, the coprocessor 1007 includes a dedicated processor, such as a network or communications processor, a compression engine, a GPGPU, a high throughput MIC processor, or an embedded processor.

The static random access memory (SRAM) unit 1008 may include one or more computer readable media configured to store data and/or instructions. The computer readable storage medium may store instructions, and specifically, stores temporary and permanent copies of the instructions.

When the SoC 1000 is applied to the electronic device according to this application, the instructions stored in the computer readable storage medium may include instructions causing the electronic device to implement the lock screen display method for the electronic device in the foregoing embodiments when being executed by at least one unit in the processor. When the instructions run on a computer, the computer is enabled to perform the foregoing lock screen display method for the electronic device in the foregoing embodiments.

In addition, an embodiment of this application further discloses a computer readable storage medium. A processing program is stored in the computer readable storage medium. When the processing program is executed by a processor, the lock screen display method for the electronic device in the foregoing embodiments is implemented.

The computer readable storage medium may be a read-only memory, a random access memory, a hard disk, an optical disc, or the like.

What is claimed is:

1. A lock screen display method implemented by an electronic device comprising a plurality of lock screens, wherein the method comprises:
   displaying, based on a preset sequence and on a screen of the electronic device, a first lock screen that is of the plurality of lock screens and that corresponds to a highest sequence level of sequence levels of the plurality of lock screens, wherein the preset sequence is set based on priorities of applications corresponding to the plurality of lock screens such that a lock screen corresponding to an application with a higher priority has a higher sequence level;
   detecting, based on contents of the plurality of lock screens or a preset operation manner of a user for the electronic device, an occurrence of a preset condition;
   determining, based on detecting the occurrence, a second lock screen from the plurality of lock screens; and
   displaying the second lock screen on the screen.

2. The lock screen display method of claim 1, wherein the preset condition is a change in content of any lock screen of the plurality of lock screens, and wherein determining the second lock screen comprises selecting, as the second lock screen, a target lock screen of one or more target lock screens whose content is detected to have changed.

3. The lock screen display method of claim 2, wherein each lock screen of the plurality of lock screens is associated with one or more corresponding applications in the electronic device, and wherein the change in the content is associated with a change in display content output by a first application of the one or more corresponding applications.

4. The lock screen display method of claim 3, wherein the first application corresponds to the first lock screen and the second lock screen, and wherein the lock screen display method further comprises updating, when the first application changes the display content to display changed content, the first lock screen to include the changed content to form the second lock screen.

5. The lock screen display method of claim 3, wherein the first lock screen is associated with a second application of the one or more corresponding applications that is different than the first application, and wherein the second lock screen is associated with the first application.

6. The lock screen display method of claim 2, wherein the one or more target lock screens comprise a plurality of target lock screens, and wherein determining the second lock screen comprises selecting, from the plurality of target lock screens, a first target lock screen having the highest sequence level in the preset sequence.

7. The lock screen display method of claim 1, wherein the preset condition comprises receiving the preset operation manner.

8. The lock screen display method of claim 7, wherein the preset operation manner comprises the user pressing a power button of the electronic device to enable the electronic device to switch between a screen-on state and a screen-off state, and wherein determining the second lock screen comprises:
   determining a time difference between the screen-on state and the screen-off state;
   determining whether the time difference satisfies a switching requirement; and
   determining, when the time difference satisfies the switching requirement and based on the preset sequence, a lock screen ranked next to the first lock screen as the second lock screen.

9. The lock screen display method of claim 7, wherein the preset operation manner comprises the user shaking the electronic device, and wherein determining the second lock screen comprises determining, based on motion data of the electronic device and the preset sequence, a lock screen ranked next to the first lock screen as the second lock screen.

10. The lock screen display method of claim 9, further comprising:
determining the motion data is greater than a first threshold; and
detecting the occurrence of the preset condition when the motion data is greater than the first threshold.

11. The lock screen display method of claim 1, further comprising:
presenting an application setting interface that comprises at least two different applications, wherein each application of the at least two different applications is configured to present a corresponding lock screen on the electronic device; and
setting the priorities based on an order in which the user sets the plurality of lock screens, wherein a lock screen that is set earlier has the higher priority.

12. The lock screen display method of claim 1, further comprising setting the priorities based on access frequency of the user for the applications.

13. The lock screen display method of claim 1, further comprising determining, based on lock screen application identifiers carried in applications corresponding to the plurality of lock screens, that the applications have the plurality of lock screens.

14. The lock screen display method of claim 3, further comprising:
requesting, by the target lock screen of the one or more target lock screens whose content is detected to have changed, the electronic device to switch to displaying the target lock screen; and
determining the target lock screen as the second lock screen.

15. The lock screen display method of claim 14, wherein within a predetermined time, a request frequency at which a target application is allowed to request the electronic device to use the target lock screen as the second lock screen through switching is less than a threshold.

16. An electronic device, comprising:
a display screen;
a plurality of lock screens; and
at least one processor coupled to the display screen and the plurality of lock screens and configured to cause the electronic device to:
display, based on a preset sequence and on the display screen, a first lock screen that is of the plurality of lock screens and that corresponds to a highest sequence level of sequence levels of the plurality of lock screens, wherein the preset sequence is set based on priorities of applications corresponding to the plurality of lock screens such that a lock screen corresponding to an application with a higher priority has a higher sequence level;
detect, based on contents of the plurality of lock screens or a preset operation manner of a user for the electronic device, occurrence of a preset condition;
determine, based on detecting the occurrence, a second lock screen of the plurality of lock screens; and
display the second lock screen on the display screen.

17. The electronic device of claim 16, wherein the at least one processor is further configured to cause the electronic device to:
detect the occurrence when content of a target lock screen of the plurality of lock screens changes; and
select the target lock screen as the second lock screen.

18. The electronic device of claim 16, wherein the at least one processor is further configured to cause the electronic device to detect the occurrence when the electronic device receives the preset operation manner.

19. The electronic device of claim 16, wherein the preset condition comprises receiving the preset operation manner.

20. The electronic device of claim 19, wherein the preset operation manner comprises the user pressing a power button of the electronic device to enable the electronic device to switch between a screen-on state and a screen-off state.

* * * * *